(12) United States Patent
Wakabayashi et al.

(10) Patent No.: US 7,581,769 B2
(45) Date of Patent: Sep. 1, 2009

(54) BUMPER ABSORBER AND MANUFACTURING METHOD FOR THE SAME

(75) Inventors: Kohsuke Wakabayashi, Nagoya (JP); Takahiko Taniguchi, Nagoya (JP); Satoru Shioya, Kawachi-gun (JP); Masakazu Sakaguchi, Yokkaichi (JP)

(73) Assignees: Hayashi Telempu Co., Ltd., Nagoya-shi, Aichi (JP); JSP Corporation, Chiyoda-ku, Tokyo (JP)

( * ) Notice: Subject to any disclaimer, the term of this patent is extended or adjusted under 35 U.S.C. 154(b) by 14 days.

(21) Appl. No.: 11/811,008

(22) Filed: Jun. 7, 2007

(65) Prior Publication Data

US 2007/0284896 A1    Dec. 13, 2007

(30) Foreign Application Priority Data

Jun. 8, 2006    (JP)    ............................. 2006-159785

(51) Int. Cl.
    B60R 19/12    (2006.01)
(52) U.S. Cl. ...................................... 293/109; 293/120
(58) Field of Classification Search ................. 293/109, 293/120–122
    See application file for complete search history.

(56) References Cited

U.S. PATENT DOCUMENTS

| | | | |
|---|---|---|---|
| 4,072,334 A | 2/1978 | Seegmiller et al. | |
| 5,100,187 A | 3/1992 | Loren | |
| 5,265,925 A | 11/1993 | Cox | |
| 6,890,009 B2 * | 5/2005 | Murata et al. | 293/109 |
| 2006/0145490 A1 * | 7/2006 | Yamaguchi et al. | 293/109 |

FOREIGN PATENT DOCUMENTS

| | | |
|---|---|---|
| JP | 2004-345423 A | 12/2004 |
| JP | 2004-345423 A | 12/2004 |
| JP | 2004-345424 A | 12/2004 |
| JP | 2004-345424 A | 12/2004 |
| JP | 2004-345425 A | 12/2004 |
| JP | 2004-345425 A | 12/2004 |
| JP | 2005-214242 A | 8/2005 |
| JP | 2005-239000 A | 9/2005 |

OTHER PUBLICATIONS

The extended European search report includes, pursuant to Rule 62 EPC, the European search report (R. 61 EPC) or the partial European search report/ declaration of no search (R.63 EPC)and the European search opinion.

* cited by examiner

Primary Examiner—Dennis H Pedder
(74) Attorney, Agent, or Firm—Yokoi & Co., U.S.A., Inc.; Peter Ganjian

(57) ABSTRACT

The present invention discloses a bumper absorber that is provided on an automobile between a bumper reinforcement and a bumper fascia, comprising a first energy absorbing portion formed by foaming a resin molded material; the first energy absorbing portion extending from the bumper reinforcement toward the bumper fascia; a second energy absorbing portion formed by a resin molded material; the second energy absorbing portion extending from the bumper reinforcement toward the bumper fascia at a position where a space that permits buckling is formed between the first energy absorbing portion and the second energy absorbing portion on the bumper reinforcement side; a crosslinking portion disposed facing a vehicle interior side of the bumper fascia; and the crosslinking portion fastening the first energy absorbing portion and the second energy absorbing portion together while sealing an opening between the first energy absorbing portion and the second energy absorbing portion on the bumper fascia side.

8 Claims, 24 Drawing Sheets ( TOP VIEW )

FIG. 21
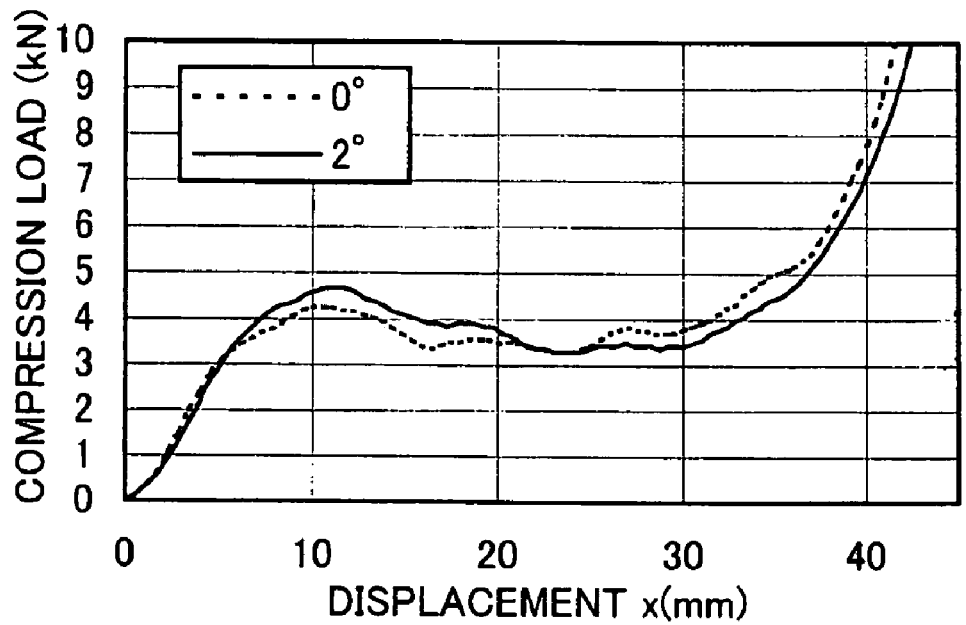
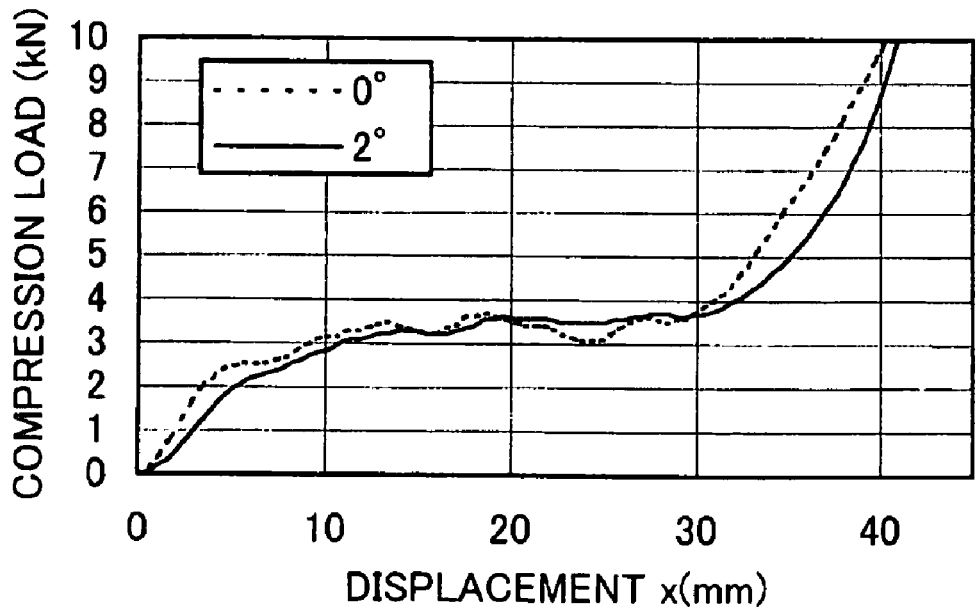

FIG. 22
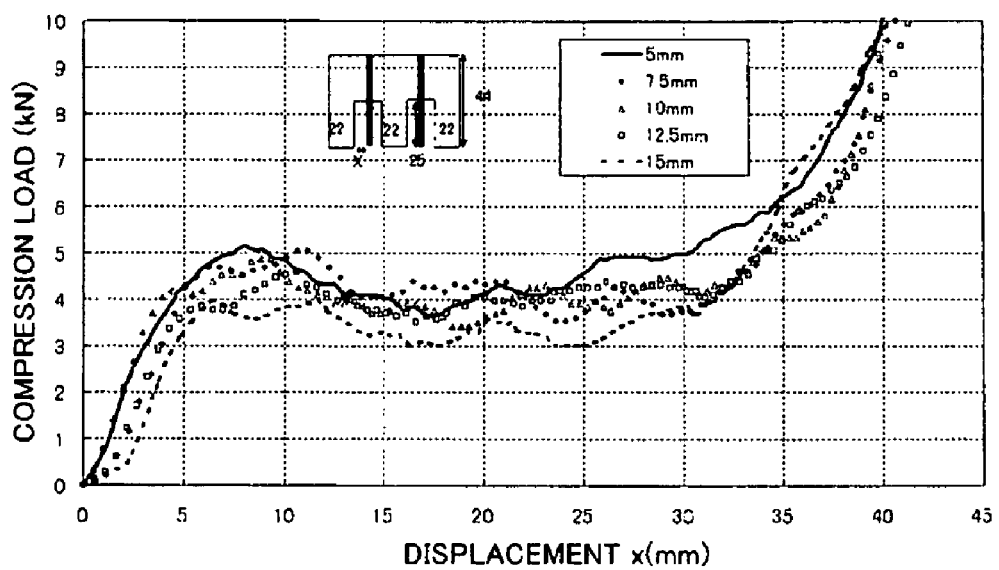
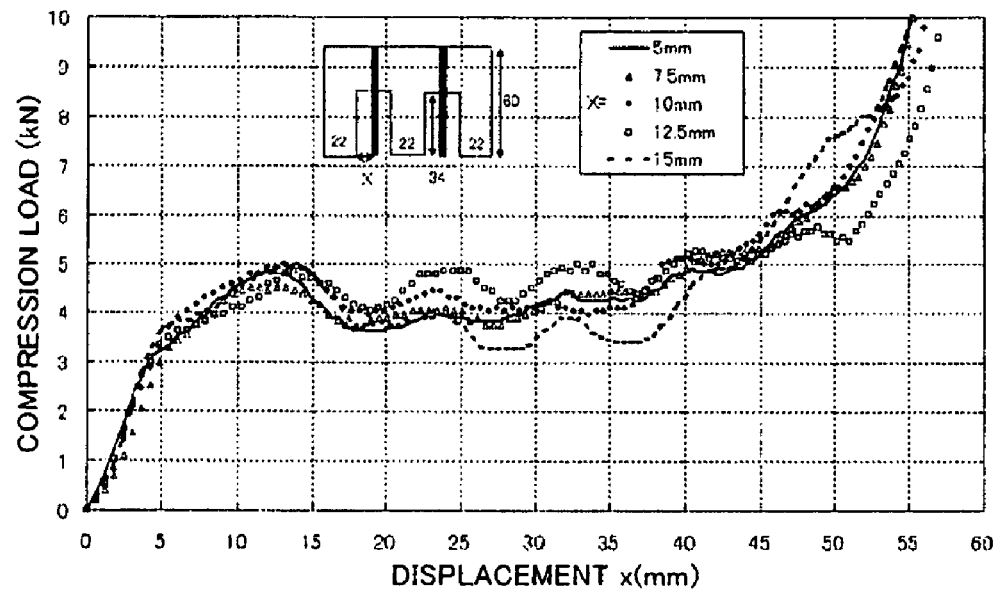

FIG. 23
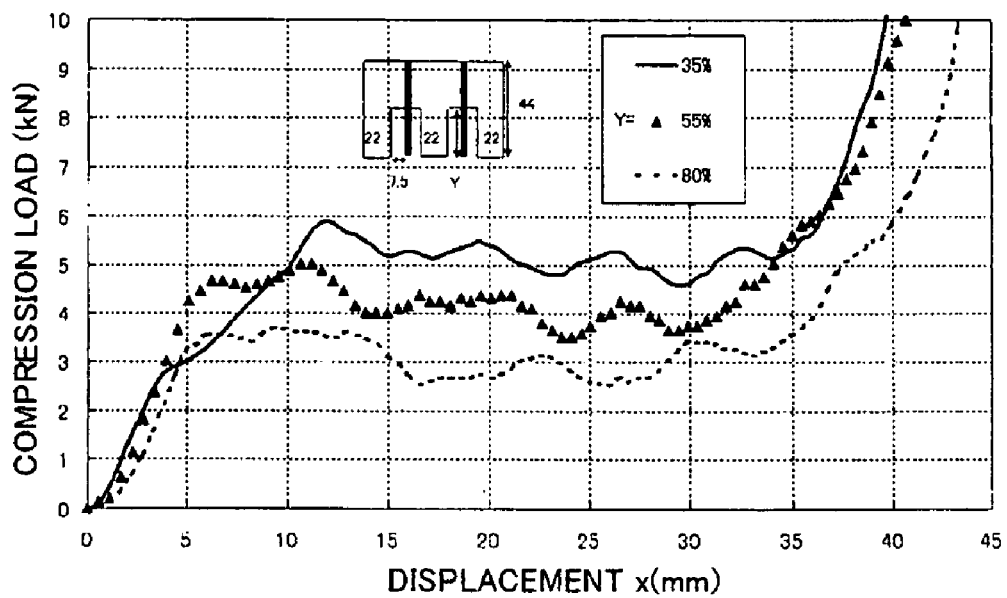
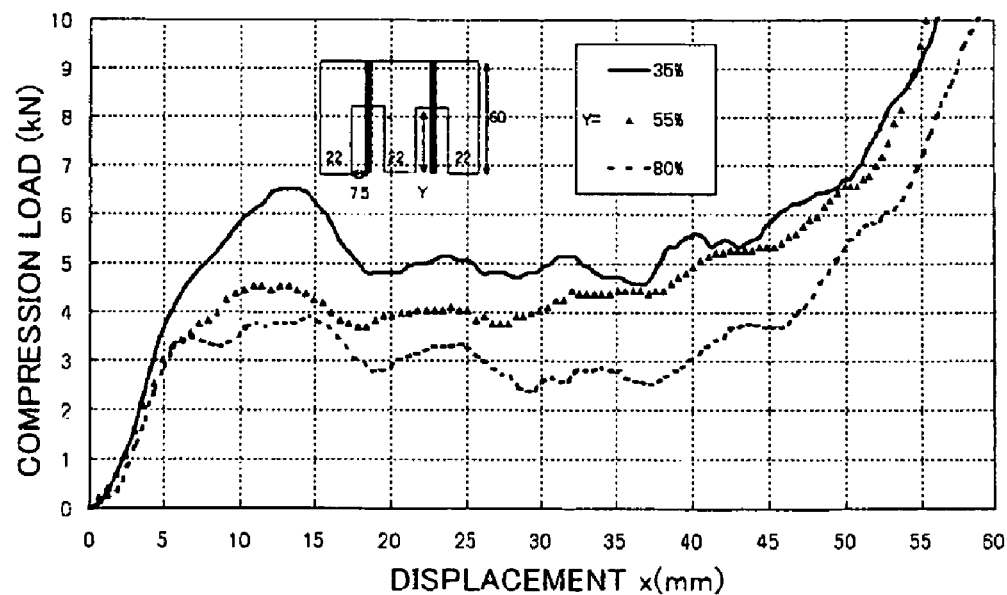

COMPARATIVE EXAMPLE

BUMPER ABSORBER AND MANUFACTURING METHOD FOR THE SAME

CROSS-REFERENCES TO RELATED APPLICATIONS

The present application is related to the Japanese Patent Application No. 2006-159785, filed on Jun. 8, 2006, the entire disclosure of which is expressly incorporated by reference herein.

BACKGROUND OF THE INVENTION

1. Field of the Invention

The present invention relates to a bumper absorber that is provided on an automobile between a bumper reinforcement and a bumper fascia, and a manufacturing method for the same.

2. Description of the Related Art

Bumpers that provide a shock absorbing capability are provided at the front and rear ends of an automobile in order to protect the vehicle body and in order to reduce the load that is applied to the legs of a pedestrian when the pedestrian is involved in an accident with a vehicle. A bumper absorber is provided between the bumper reinforcement and the bumper fascia.

Patent Document 1 (Japanese Patent Application Publication No. JP-A-2004-345423) and Patent Document 2 (Japanese Patent Application Publication No. JP-A-2004-345425) disclose an impact energy absorbing apparatus for a vehicle bumper that is provided with a compression energy absorbing material, a buckling energy absorbing material that includes plate-shaped members, and a plurality of columnar linking members that are disposed with spaces therebetween. Paragraph 0008 and FIG. 6 in Patent Document 1 disclose that in the compression energy absorbing material, a tendency is exhibited in which the acting shock force becomes larger as the displacement thereof becomes larger, and in the buckling energy absorbing material, a tendency is exhibited in which, during the initial stage in which a shock force is acting, the acting shock force rapidly becomes large and approaches a peak value, and subsequently, the shock force rapidly decreases. In addition, by combining the impact energy absorption characteristics of the compression energy absorbing material and the impact energy absorbing characteristics of the buckling energy absorbing material, over the entire impact energy absorbing interval during which the impact energy is absorbed by both impact absorbing materials, the shock force thereon is maintained at a target value that enables the protecting of a pedestrian, and the maximum absorption of the impact energy is enabled while the protective capacity of the pedestrian is ensured.

Paragraph 0012 of Patent Document 1 discloses that, at the position at which the linking members are provided, the compression energy absorbing material does not readily undergo compression deformation by an amount equivalent to the thickness of the linking members in the front-back direction of the vehicle body, but because there are no obstructions between the linking members, substantially the whole width of the compression energy absorbing material undergoes compression deformation in the front-back direction of the vehicle body, and the impact energy can be efficiently absorbed. This means that a plurality of columnar linking members must be provided, and that a space must be provided between the linking members.

Patent Document 3 (Japanese Patent Application Publication No. JP-A-2004-345424) discloses an impact energy absorbing apparatus for a vehicle bumper that is provided with a compression energy absorbing material, a buckling energy absorbing material that consists of plate-shaped members, and a front fixed supporting member that is provided so as to project on the inner surface of the bumper fascia and to support the front end portion of both energy absorbing materials. The front fixed supporting member is integrally formed with the bumper fascia. Specifically, when viewing the impact energy absorbing apparatus from the front side after removing the bumper fascia, a large opening is formed between the compression energy absorbing material and the buckling energy absorbing material.

In the technology that is disclosed in Patent Documents 1 and 2, because the front side of both energy absorbing materials have large openings, it can be anticipated that the shock absorbing capacity will fluctuate due to the orientation of the impact surface of the impacted object that has impacted the bumper fascia. Specifically, in the case in which the impact surface of the impacted object that has impacted the bumper fascia is not perpendicular to the upper and lower surfaces of the compression energy absorbing material and the upper and lower surfaces of the buckling energy absorbing material, because a large portion of the front sides of both energy absorbing materials is open, the compression energy absorbing material and the buckling energy absorbing material collapse either upward or downward in the same direction, and it can be anticipated that the impact absorbing capacity will thereby be reduced.

In the technology that is disclosed in Patent Document 3, the structure that supports the front end portions of both energy absorbing materials must be formed on the bumper fascia, and thus the structure of the bumper fascia becomes complicated.

BRIEF SUMMARY OF THE INVENTION

An advantage of some aspects of the invention is to provide a bumper absorber that enables reducing the influence on the impact absorbing capacity due to the orientation of the impact surface of the impacted object that has impacted the bumper fascia without making the structure of the bumper fascia complicated.

One aspect of the present invention provides a bumper absorber that is provided on an automobile between a bumper reinforcement and a bumper fascia that is more toward a vehicle exterior side than the bumper reinforcement, comprising:

a first energy absorbing portion formed by foaming a resin molded material;

the first energy absorbing portion extending from the bumper reinforcement toward the bumper fascia;

a second energy absorbing portion formed by a resin molded material;

the second energy absorbing portion extending from the bumper reinforcement toward the bumper fascia at a position where a space that permits buckling of the second energy absorbing portion is formed between the first energy absorbing portion and the second energy absorbing portion on the bumper reinforcement side;

a crosslinking portion disposed facing a vehicle interior side of the bumper fascia; and the crosslinking portion fastening the first energy absorbing portion and the second energy absorbing portion together while sealing at least half of an area of an opening between the first energy absorbing portion and the second energy absorbing portion on the bumper fascia side.

Specifically, because a space is formed between the first energy absorbing portion that is formed by foaming a resin molded material and the second energy absorbing portion that is formed by a resin molded material, in which the second energy absorbing portion is not restrained, the deformation of the second energy absorbing portion is not hindered when a shock force is imparted. Thus, at the first energy absorbing portion, when the shock force is imparted, the reaction force becomes larger as the displacement of the first energy absorbing portion becomes larger, while in contrast, at the second energy absorbing portion, the reaction force during the initial stage rapidly becomes large and reaches a maximum, and subsequently, the reaction force rapidly becomes small. As a result, the reaction force applied to the impacted object becomes a reaction force that is a combination of the first and second energy absorbing portions, and a substantially constant reaction force acts on the impacted object over a long period of the displacement of the absorber. Therefore, it becomes possible to absorb the impact energy suitably over a long period of the displacement of the absorber, and an advantageous shock absorbing capacity can thereby be obtained.

In addition, the crosslinking portion fastens both the first energy absorbing portion and the second energy absorbing portion together while sealing the opening therebetween on the bumper fascia side. Thus, there are no or small opening portion in the absorber on the bumper fascia side. Thereby, even if the impact surface of the impacted object that has impacted the bumper fascia is not perpendicular to the direction in which the bumper reinforcement and the bumper fascia are joined, because the imparted load is received over a wide surface of the second energy absorbing portions, it is possible to avoid the phenomenon in which the first and second energy absorbing portions collapse only in a certain direction. Therefore, it is possible to reduce the influence on the shock absorbing capacity due to the orientation of the impact surface of the impacted object.

In this case, because it is not necessary to form a structure that supports the bumper fascia side of the first and second energy absorbing portions on the bumper fascia, the structure of the bumper fascia does not become complicated.

The front portion of an automobile, the rear portion of an automobile, the side portions of an automobile and the like may be considered to be the positions at which this bumper absorber may be provided. The bumper fascia described above may be provided in a direction that is offset from the horizontal direction when viewed from the bumper reinforcement.

The resin molded material described above may be a molded material that includes a resin, may be a material that consists only of resin, or may be a material that includes base materials other than a resin, such as additives.

The direction of extension of the first and second energy absorbing portions may be a direction that is offset from the horizontal direction. The first energy absorbing portion may or may not be in contact with the bumper fascia. The second energy absorbing portion may or may not also be in contact with the bumper fascia.

The crosslinking portion may completely seal the opening between the first energy absorbing portion and the second energy absorbing portion on the bumper fascia side, or may seal at least half of the area of the opening. By fastening both energy absorbing portions together using the crosslinking portion while making the area of the opening therebetween equal to or less than half, that is, making the area of the opening that is covered equal to or greater than the area of the opening that is not covered, even if the impact surface of the impacted object that has impacted the bumper fascia is not perpendicular to the direction in which the bumper reinforcement and the bumper fascia are joined, it is possible to avoid the phenomenon in which the first and second energy absorbing portions collapse only in a certain direction. Therefore, it is possible to reduce the influence on the shock absorbing capacity due to the orientation of the impact surface of the impacted object that has impacted the bumper fascia.

Another aspect of the present invention provides a manufacturing method for a bumper absorber that is provided on an automobile between a bumper reinforcement and a bumper fascia that is more toward a vehicle exterior side than the bumper reinforcement, the method comprising:

using a mold that shapes the bumper absorber such that the bumper absorber is provided with a first energy absorbing portion that extends from the bumper reinforcement toward the bumper fascia, a second energy absorbing portion that extends from the bumper reinforcement toward the bumper fascia at a position where a space that permits buckling is formed between the first energy absorbing portion and the second energy absorbing portion on the bumper reinforcement side, and a crosslinking portion that fastens the first energy absorbing portion and the second energy absorbing portion together while sealing an opening between the first energy absorbing portion and the second energy absorbing portion on the bumper fascia side;

using a supporting portion that passes through the crosslinking portion from the bumper fascia side and supports a resin molded body at the position of the second energy absorbing portion in the mold;

inserting the resin molded body into the mold at the position of the second energy absorbing portion;

supporting the resin molded body by the supporting portion;

inserting a resin molded material that includes a foaming agent into the mold; and forming the crosslinking portion and the first energy absorbing portion simultaneously by foaming the resin molded material while forming a through hole in the crosslinking portion at the position of the supporting portion so as to integrate the crosslinking portion and the first energy absorbing portion with the resin molded body.

Specifically, the crosslinking portion and the first energy absorbing portion are formed simultaneously in a mold by supporting the resin molded body by the supporting portion at the position of the second energy absorbing portion in the mold, and the crosslinking portion and the first and second energy absorbing portions are formed simultaneously. Thus, it is possible to reduce the number of processing steps for the absorber. In addition, the second energy absorbing portion are supported by the supporting portion, and thus it is possible to prevent deformation of the second energy absorbing portion during the molding of the absorber, and it is possible to improve the processing precision of the absorber.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purpose of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

FIG. 21 shows graphs that represent fluctuations in the compression load with respect to displacement for example 1 and a comparative example;

FIG. 22 shows graphs that represent the fluctuation of the compression load with respect to displacement for example 2;

FIG. 23 shows graphs that represent the fluctuation of the compression load with respect to displacement for example 3.

DETAILED DESCRIPTION OF THE INVENTION

The detailed description set forth below in connection with the appended drawings is intended as description of presently preferred embodiments of the invention and is not intended to represent the only forms in which the present invention may be constructed and or utilized.

Figure 6:
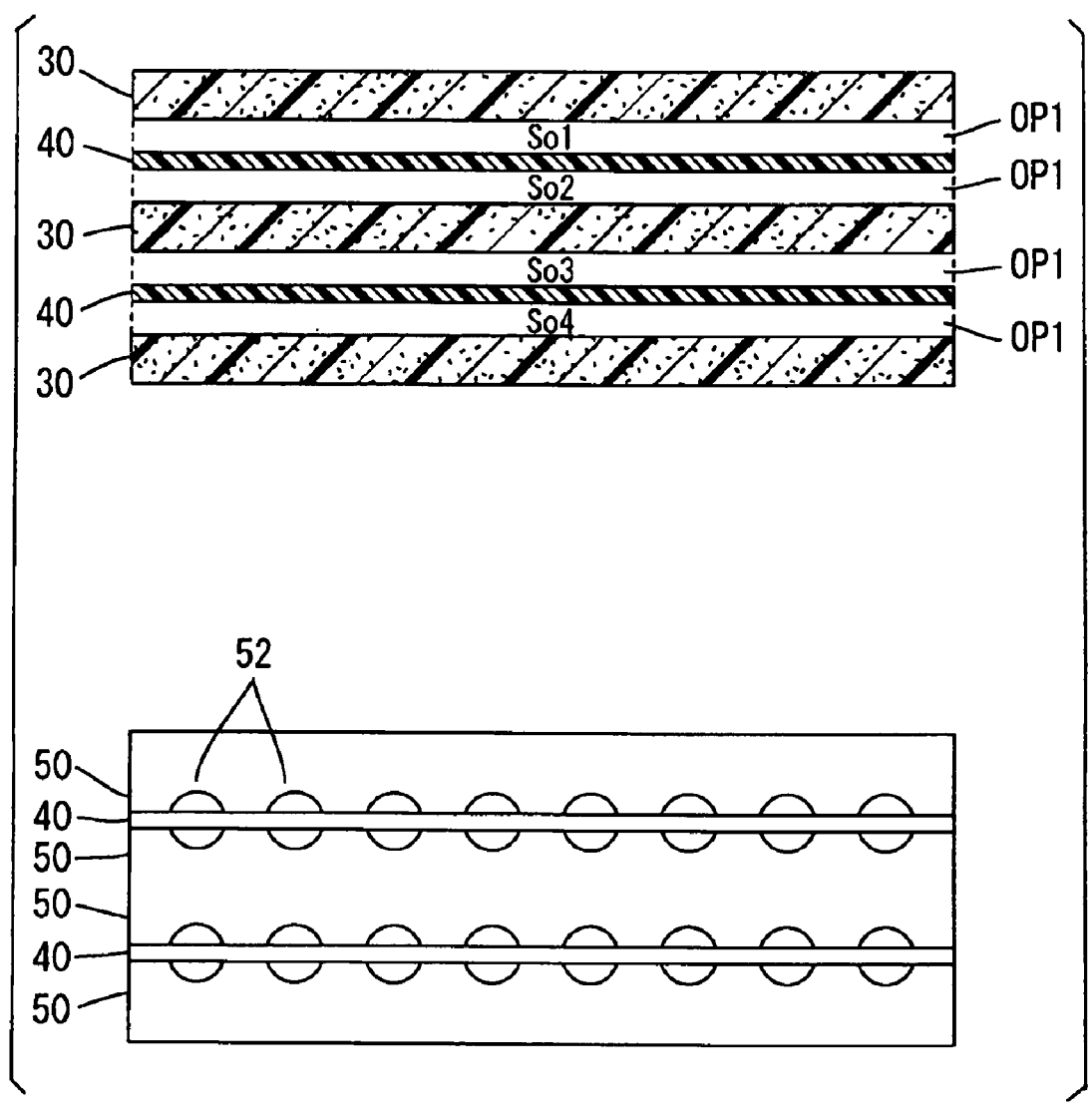
FIG. 6 is an exemplary illustration of a view that shows the area ratio of openings between the first and second energy absorbing portions that is sealed.
Figure 7:
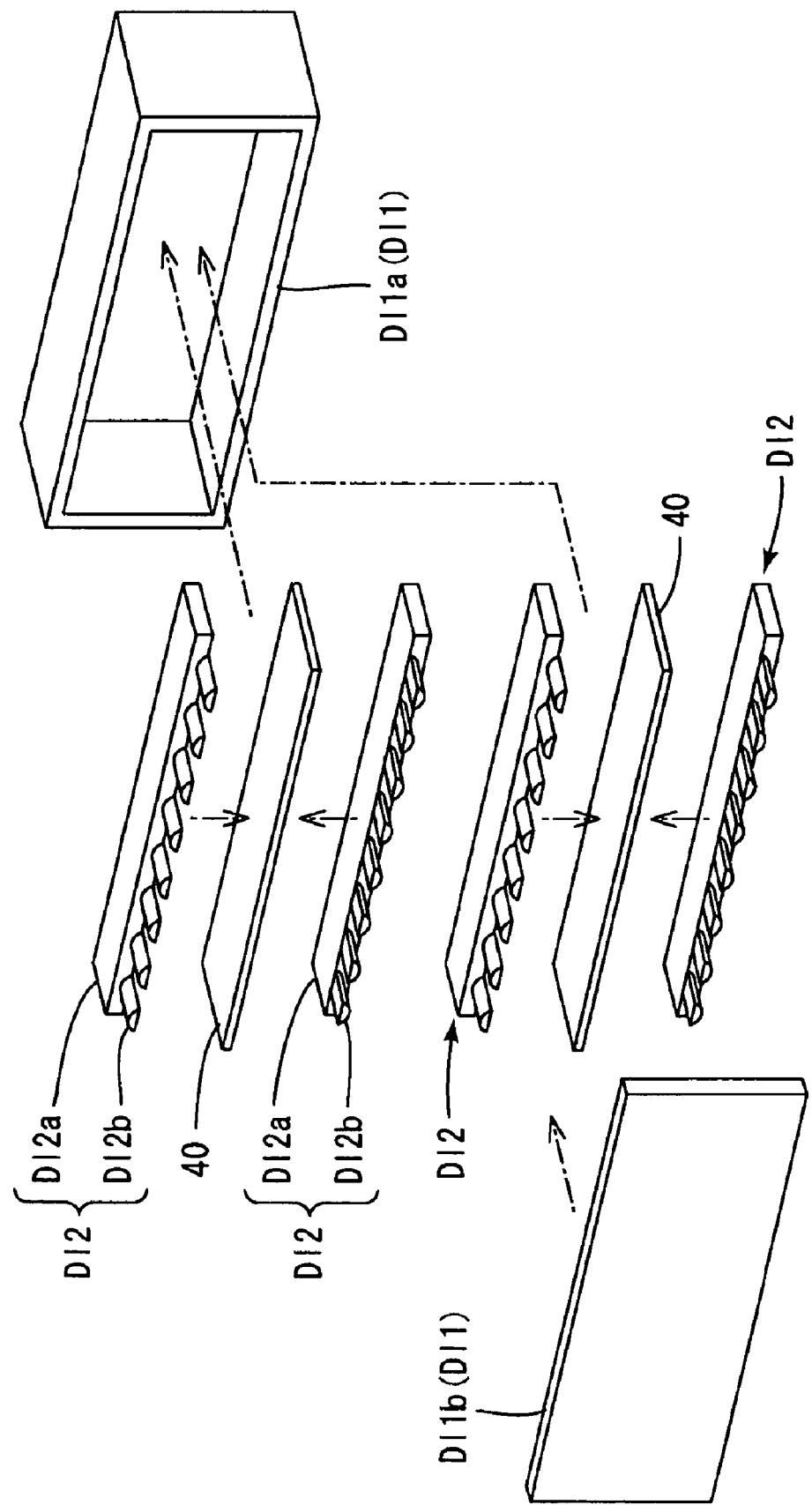
FIG. 7 is an exemplary illustration of an exploded perspective view that schematically shows an arrangement in which the absorber is manufactured.
Figure 8:
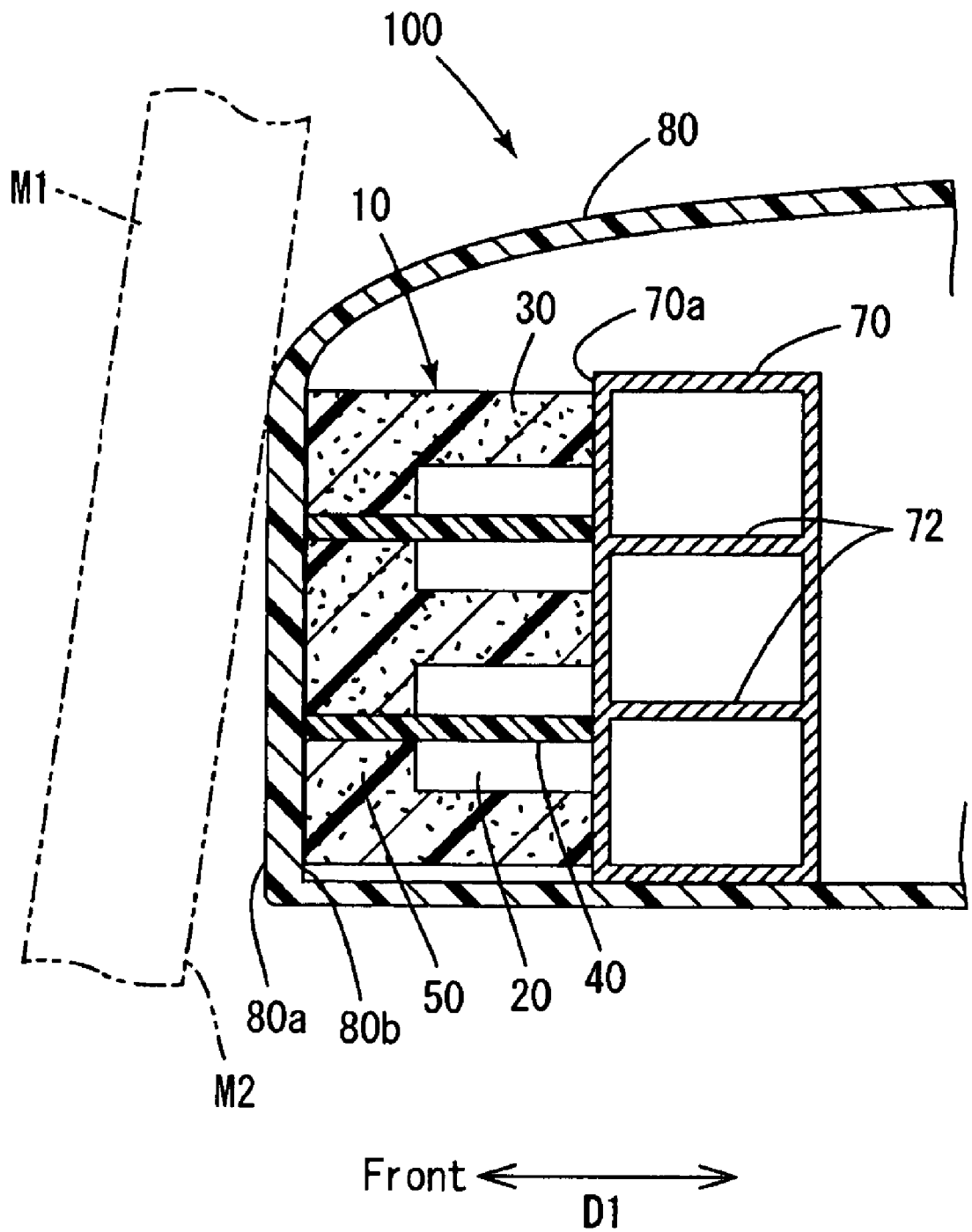
FIG. 8 is an exemplary illustration of a perpendicular cross-sectional view that shows the arrangement in which the absorber is installed in the bumper.

Below, embodiments of the present invention will be explained in the following order:
(1) a structure of the bumper absorber according to a first embodiment;
(2) a manufacturing method of the bumper absorber according to the first embodiment;
(3) operation and effects of the bumper absorber according to the first embodiment;
(4) a second embodiment;
(5) a third embodiment;
(6) a fourth embodiment;
(7) a fifth embodiment
(8) a sixth embodiment
(9) a seventh embodiment
(10) an eighth embodiment
(11) examples
(12) comparative example (1) The Structure of the Bumper Absorber FIG. 1 is an exploded cross-sectional view of the essential components of a passenger automobile that uses a bumper absorber 10 according to the first embodiment, FIG. 2 to FIG. 6 are figures that show the absorber 10, FIG. 7 is an exploded perspective view that schematically shows an arrangement in which the absorber 10 is manufactured, and FIG. 8 shows in perpendicular cross-section the arrangement in which the absorber 10 is installed in an automobile bumper 100.

Figure 1:
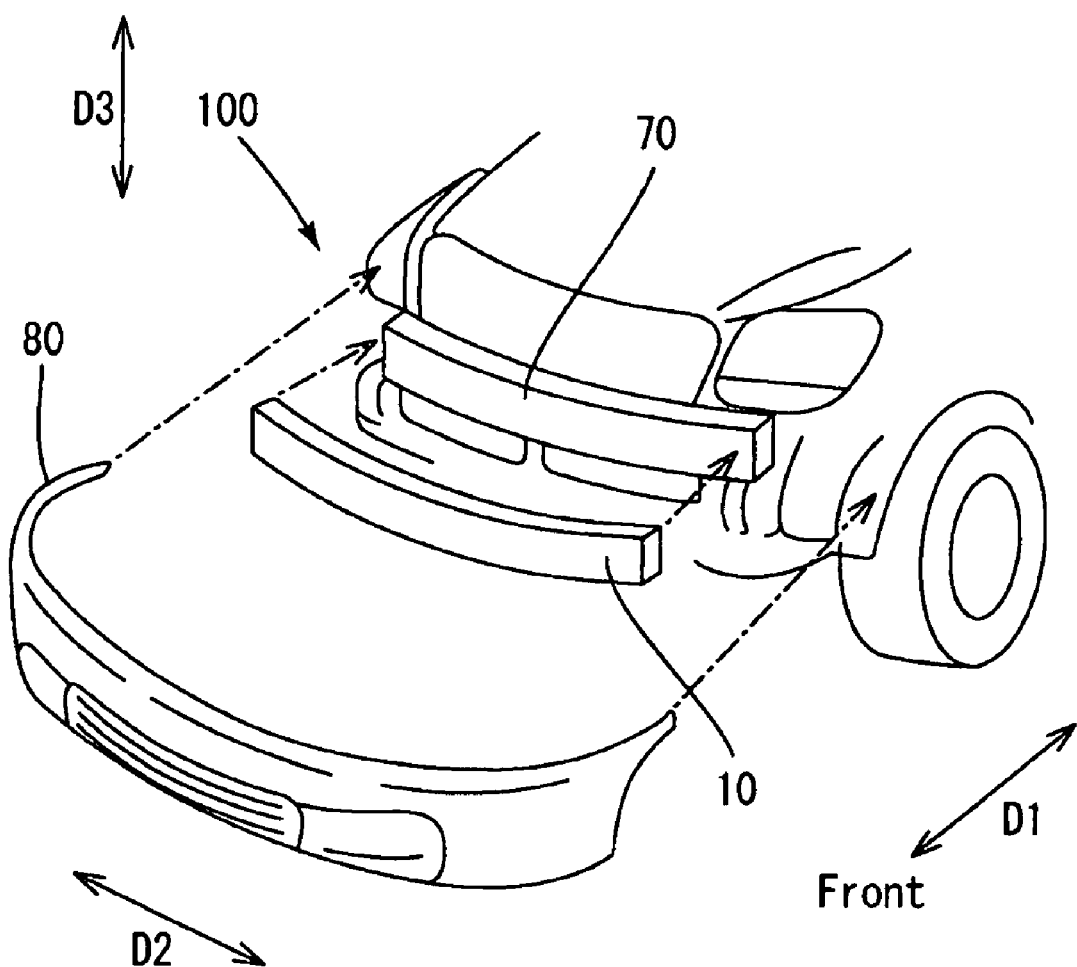
FIG. 1 is an exemplary illustration of an exploded perspective view that shows essential components of an automobile in which a bumper absorber is used.
Figure 2:
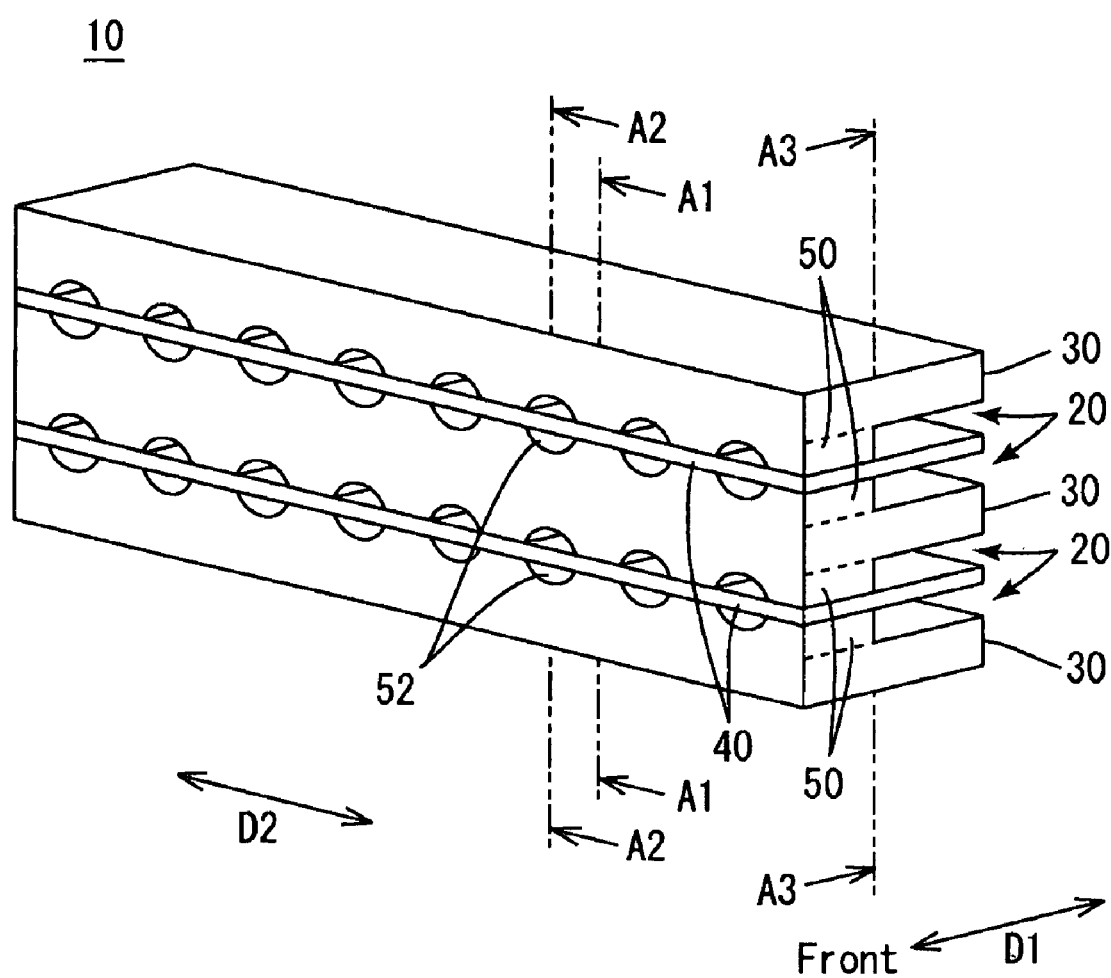
FIG. 2 is an exemplary illustration of a perspective view that shows an external appearance of the absorber when viewed from the front side.
Figure 3:
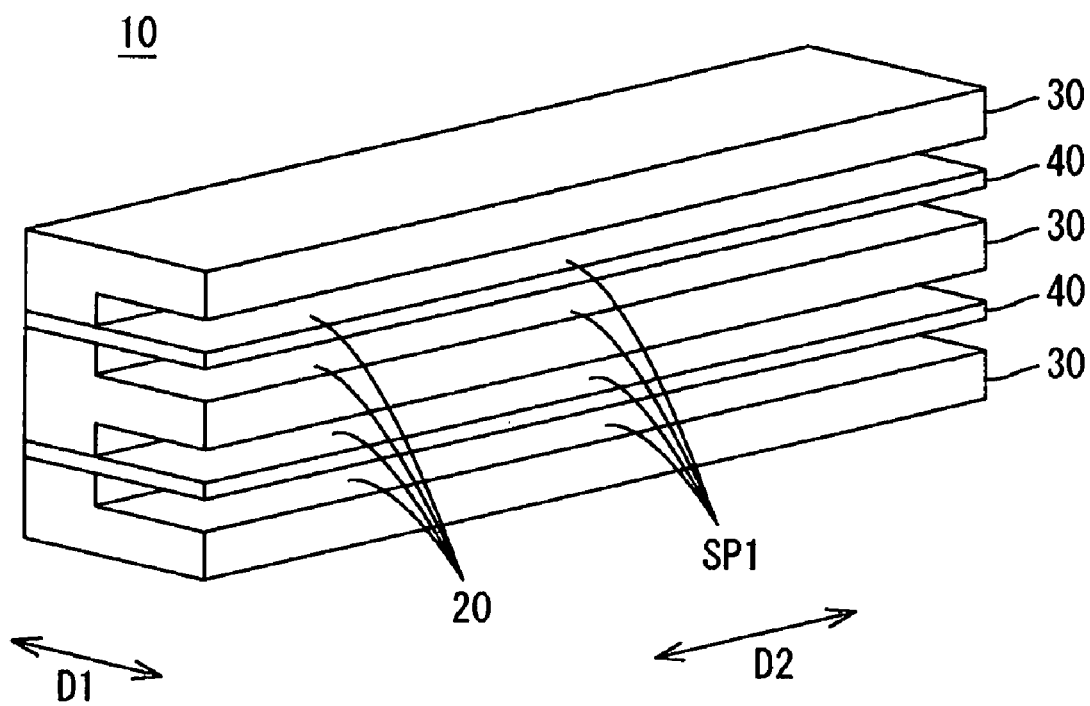
FIG. 3 is an exemplary illustration of a perspective view that shows the external appearance of the absorber when viewed from the back side.
Figure 4:
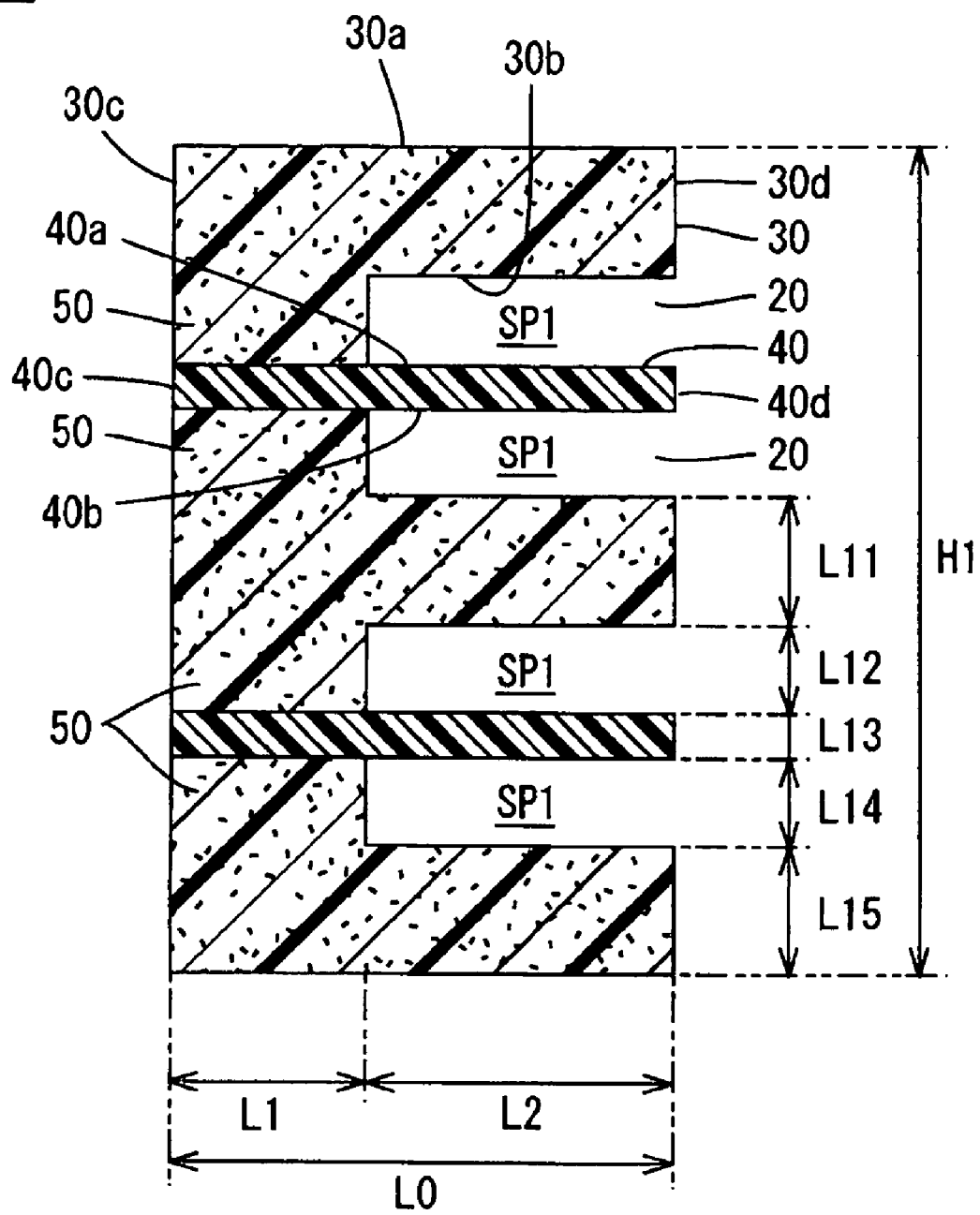
FIG. 4 is an exemplary illustration of a perpendicular cross-sectional view that shows a cross section of the absorber along line A1-A1 in FIG. 2.

FIG. 1 shows an exploded view of the bumper 100 in the front of the passenger vehicle. The bumper absorber according to the present invention can be applied at the rear and side bumpers of an automobile, but an absorber 10 at the front of an automobile will be explained as an example.

The front bumper 100 is provided with a bumper reinforcement 70 that is installed on the front side of the vehicle body of the automobile and fastened; a bumper fascia 80 that is provided more toward the front side (the vehicle exterior side) than this reinforcement 70 and covers the reinforcement 70 and the absorber 10; and the bumper absorber 10 that is provided between the reinforcement 70 and the bumper fascia 80 in order to absorb shocks. Of course, bumpers that are provided with parts other than these parts 10, 70 and 80 are included in the present invention.

The bumper reinforcement 70 has a length that approximates the width of the automobile, the longitudinal direction thereof is disposed facing a transverse direction D2 of the vehicle, and for example, it is fastened by being linked to the front end portion of a pair of right and left front side frames that extend in a front-back direction D1 at the front portion of the vehicle body. The reinforcement 70 is, for example, made of a metal such as a copper or steel, has an external shape that is elongated in the transverse direction of the vehicle, and is shaped into a substantially right-angled parallelepiped such as a straight right-angled parallelepiped or a curved right-angled parallelepiped. As shown in FIG. 8, a plurality of plate-shaped partitioning walls 72 for reinforcement traverse the front-back direction inside the reinforcement member 70, and the reinforcement member 70 has a tubular shape with hollow portions. Of course, various structures can be considered for the reinforcement, and the reinforcement has a structure that affords the required strength and shock absorbing capacity for protecting the vehicle body during a traffic accident or the like. In addition, the reinforcement also has the role of breaking down and absorbing shock, and at the same time, also functions as a base for the bumper absorber that exhibits the shock absorbing function after breaking down.

The bumper fascia 80 has a length equivalent to the width of the automobile, the longitudinal direction thereof is disposed facing the transverse direction D2 of the vehicle, and it is installed and fastened onto the front of the vehicle body. The bumper fascia 80 is formed into a thin plate shape by molding a resin molded material that includes a synthetic resin such as a thermoplastic resin or a thermosetting resin by using a press molding, injection molding or the like. When viewed from outside the automobile, the bumper fascia 80 covers the reinforcement 70 and the absorber 10, and at the same time, a design that is suitable for forming the front surface of the automobile is provided on the outer surface. In addition, the bumper fascia 80 has the functions of obstructing external heat, rain, and wind from entering inside the vehicle, and guaranteeing that the shock absorbing capacity of the reinforcement 70 and the absorber 10 are not reduced. Moreover, passages called grills, whose object is to introduce air into a radiator, may be provided on the bumper fascia 80.

Because the bumper fascia 80 is formed into a thin-walled shape by a resin molded material, the bumper fascia 80 deforms under a comparatively small load when a shock is imparted. In addition, the imparted shock energy is absorbed mainly by the absorber 10, and in the case in which the shock energy is not absorbed by the absorber 10, it is absorbed by the reinforcement 70.

The bumper absorber 10 is provided in order to protect a pedestrian during an accident that may cause physical injury. When an impacted object such as a knee of a pedestrian is impacted by the front surface (the vehicle exterior side surface 80a) of the bumper fascia from the direction of the bumper fascia, the bumper absorber 10 receives the shock, deforms between the impacted object and the bumper reinforcement, absorbs the energy of the impact and thus reduces the reaction force on the impacted objects.

A resin foam molded body that is shaped by filling a molding die with foamed resin particles and fusing them together while heating them, a blow molded body (a type of resin molded body) in which a hollow portion is formed while blowing air into a parison, which is a resin that has been formed into a tubular shape, or a resin ejection molded body (a type of resin molded body) that has been formed by ejection molding a resin so as to attain a predetermined form, can be used as the bumper absorber 10. The bumper absorber 10 of the present invention is structured by combining a foamed resin molded body and a resin molded body to attain a superior shock absorbing capacity.

The bumper absorber 10 is provided with flexible legs (first energy absorbing portions) 30 that are formed by foaming a resin molded material; rigid legs (second energy absorbing portions) 40 that are formed by a resin molded material; and crosslinking portions 50 that are disposed facing the vehicle interior side surface of the bumper fascia 80. The flexible legs 30 extend from the reinforcement 70 toward the bumper fascia 80. The rigid legs 40 extend from the reinforcement 70 toward the bumper fascia 80 at positions where spaces SP1 that permit buckling are formed between the rigid legs 30 and the flexible legs 40 on the reinforcement 70 side. The crosslinking members 50 fasten the flexible legs 30 and the rigid legs 40 together on the bumper fascia 80 side. Here, the crosslinking portions 50 seal at least half of the area of the openings OP1 between the flexible legs 30 and the rigid legs 40 on the bumper fascia 80 side.

Although the absorbed amount of the shock energy becomes larger as the bumper absorber becomes longer in the front-back direction, because the vehicle is elongated in the front-back direction, a structure is required in which the bumper absorber can absorb a required energy without applying an excessive reaction force to the impacted object while being made as short as possible in the front-back direction.

Figure 9:
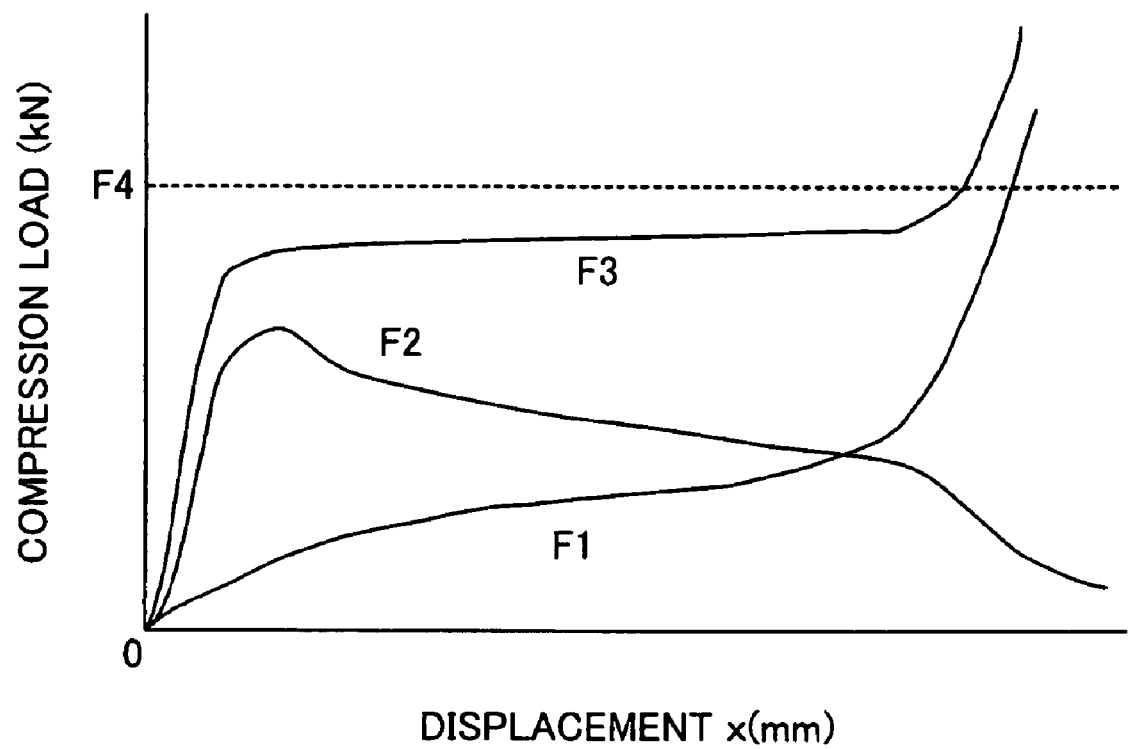
FIG. 9 is an exemplary illustration of a graph that shows compression loads with respect to the displacement x of the absorber.

FIG. 9 shows, in the form of a graph, a compression load (reaction force) F with respect to a displacement x of absorbers that are made of a foamed resin molded body, a resin molded body having an extended shape, and a combination thereof Here, within a range in which the compression load F does not become excessive, the compression load F rapidly becomes large in the area in which the displacement x is small, and subsequently, if the compression load F becomes substantially constant at a long displacement, it is possible to absorb much of the shock energy without imparting an excessive reaction force to the impacted object. If provided with such x–F characteristics, the shock absorbing capacity of the absorber is extremely advantageous.

Note that the measurement of the compression load F with respect to the displacement x can be carried out, for example, as follows.

First, an absorber sample that impacts an impactor having a predetermined shape is installed on a stationary platform at a predetermined location. The impactor is moved horizontally at a constant speed (for example, 20 km/h) towards the stationary platform. A load sensor for measuring the compression load F is built into the impactor, and it is possible to detect the compression load F according to the movement position of the impactor by a control apparatus (not illustrated). The displacement x of the absorber shows the movement distance from the position at which the impactor contacts the absorber sample.

In addition, it is possible to measure the compression load F with respect to the displacement x of the absorber sample by impacting the impactor on the absorber sample from the front under the conditions described above.

A foamed resin molded body such as a flexible leg has an x–F characteristic in which a compression load F1 becomes larger as the displacement x of the foamed resin molded body becomes larger. Only in the foamed resin molded body, the absorbed amount of the shock energy decreases as the rise of the compression load slows during the initial stage of the displacement. In contrast, the x–F characteristic of a resin molded body such as a rigid leg is one in which, when the compression force is applied in the direction in which a rigid leg is extended, a compression load F2 rapidly becomes large and reaches a peak in the early stage during which the compression force has been applied, and subsequently, the compression load F2 rapidly becomes small. Therefore, in the resin molded body, the absorbed amount of the shock energy decreases as the compression load becomes small in the late stage of the displacement.

The compression load F3 of the absorber becomes equivalent to the compression loads F1+F2, which combines the compression load F1 of the foamed resin molded body and the compression load F2 of the resin molded body, and becomes a substantially constant compression load over an extended period during which displacement occurs. As a result, the reaction force on the impacted body becomes a substantially constant reaction force that is a combination of the reaction force from the foamed resin molded body and the resin molded body, and within a range in which the shock does not become excessive during the initial stage after the shock has occurred, the reaction force rapidly becomes large, and subsequently, becomes substantially constant over a long displacement.

This absorber 10, substantially similar to the reinforcement 70, has a length that approximates the width of the automobile, has an exterior form that is elongated in the transverse direction of the vehicle, and forms, for example, a straight substantially rectangular parallelepiped or a curved substantially rectangular parallelepiped in which grooves are formed on the reinforcement 70 side. In the absorber 10 of the present embodiment, a shock receiving surface that receives the shock is formed on the front side facing the bumper fascia 80, and the flexible legs 30 and the rigid legs 40 that extend from this shock receiving surface to the reinforcement 70 are provided alternately at a predetermined spacing at positions that are adjacent to each other in a vertical direction D3.

A length L0 (L1+L2 in FIG. 4) of the absorber 10 in the front-back direction D1 is set depending on the type of the vehicle, but, for example, may be set between 30 to 150 mm. In addition, a length H1 of the absorber 10 in the vertical direction is set depending on the type of the vehicle, but, for example, may be set between 20 to 150 mm. Here, when H1>L0, it is observed that the flexible legs and the rigid legs collapse in the same direction infrequently when a shock is imparted, and thus the shock absorbing capacity is improved.

Here, a flexible leg 30 is formed by foaming a resin and molding the same into a plate shape that is vertically thicker than the rigid legs 40, a back edge portion 30d thereof is brought into contact with a front surface (a vehicle exterior side surface 70a) of the reinforcement, a front edge portion 30c is brought into contact with a back surface (a vehicle interior side surface 80b) of the bumper fascia by extending forward from the reinforcement 70 side toward the bumper fascia 80, and it is positioned such that an upper surface 30a and a lower surface 30b are horizontal. In addition, a plurality of flexible legs 30 is provided from the crosslinking portion 50 toward the reinforcement 70 so as to form groove-shaped recessed portions 20 on the reinforcement 70 side. The recessed portions 20 are formed having a groove-shape that is recessed from the reinforcement side toward the bumper fascia side, the longitudinal direction thereof is disposed toward the transverse direction D2 of the vehicle, and the spaces SP1 are formed that permit buckling of the rigid legs 40. In the present embodiment, a plurality of recessed portions is formed on the back surface of the absorber 10, and each of the recessed portions is formed into a cross-sectional square-c shaped notch.

A rigid leg 40 is formed by molding the resin without foaming into a plate shape that is vertically thinner than the flexible legs 30, a back edge portion 40d thereof is brought into contact with the front surface (the vehicle exterior side surface 70a) of the reinforcement, a front edge portion 40c, which extends from the reinforcement 70 side toward the bumper fascia 80, is brought into contact with the back surface (the vehicle interior side surface 80b) of the bumper fascia, and an upper surface 40a and a lower surface 4b are disposed so as to be horizontal. In addition, the rigid leg 40 extends from the crosslinking portion 50 toward the reinforcement 70 horizontally within the recessed portion 20 at a position where the spaces SP1 that permit buckling are formed. In the present embodiment, a plurality of rigid legs is provided, and each of the rigid legs is placed between a pair of flexible legs in the vertical direction so as not to contact each of the flexible legs. Note that the rigid leg may be disposed so as to be separated from either one of the pair of flexible legs and in contact with the other.

Because the front edge portion 40c of the rigid leg contacts the bumper fascia, the slope of the rising load on the x–F curve becomes large due to the reaction force of the rigid legs 40 during the initial period of the impact, and it is possible to afford an extremely advantageous shock absorbing capacity to the absorber.

The crosslinking portions 50 are formed by foaming and molding a resin molded material simultaneously with the flexible legs 30 while sandwiching the edge portions 40c of the rigid legs 40 on the bumper fascia side. Therefore, each of the portions 30, 40, and 50 of the absorber 10 is simultaneously and integrally formed. Thereby, it is possible to reduce the number of processing steps for the absorber, and it is possible to manufacture the absorber with high efficiency.

In addition, through holes 52 are formed in the crosslinking portions 50 of the present embodiment that link the reinforcement side 70 side and the bumper fascia 80 side in order to insert supporting portions that support the front edge portions 40c of the rigid legs during molding. In addition, the crosslinking portions 50 fasten the flexible legs 30 and the rigid legs 40 together while sealing at least half of the area of the openings OP1 between the flexible legs 30 and the rigid legs 40 on the bumper fascia 80 side.

Figure 5:
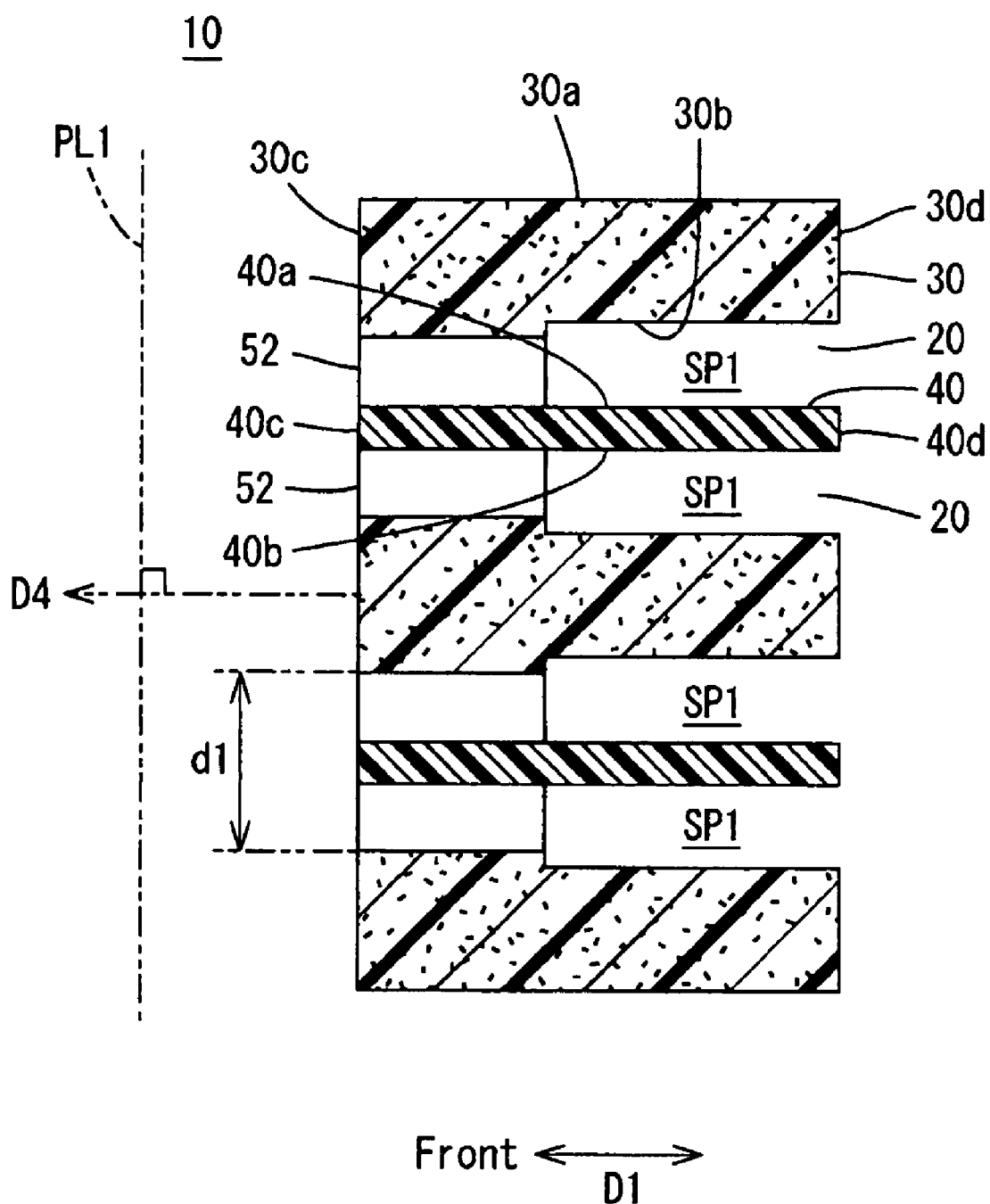
FIG. 5 is an exemplary illustration of a perpendicular cross-sectional view that shows a cross section of the absorber along line A2-A2 in FIG. 2.

Note that, with reference to FIG. 5, a total area So of the openings OP1, a total area Sh of the through holes 52, and a total area Sb of the portion of the crosslinking portions 50 that covers the openings OP1 can be represented by the projected areas of the portion of the crosslinking portions 50 that covers the openings OP1, the through holes 52, and the openings OP1 when projected in an extension direction D4 onto a surface PL1 that is perpendicular to the extension direction D4 of the flexible legs 30 and the rigid legs 40 from the reinforcement 70 toward the bumper fascia 80. These projected areas are shown in FIG. 6. Note that, in FIG. 6, the upper drawing is a perpendicular cross-sectional view of the absorber 10 taken along line A3-A3 in FIG. 2, and the lower drawing is a frontal view of the absorber 10 when viewed from the front.

In the present embodiment, the openings OP1 are formed in a plurality of locations. When the projected area of each of the openings OP1 is denoted by So1, So2, . . . , SoN (where N is an integer equal to or greater than 1), the total area So of the openings is expressed by $\Sigma Soi$ (i=1 to N). When the projected area of each of the through holes 52 is denoted by Shi (where i=1 to M, and M is an integer equal to or greater than 1), the total area Sh of the through holes is represented by $\Sigma Shi$. The total area Sb of the portion of the crosslinking portion 50 that covers the openings OP1 is represented by So−Sh. In addition, by fastening the flexible legs and the rigid legs together by covering the openings OP1 such that Sb≧Sh, that is, by covering the openings OP1 such that the area of the crosslinking portions is equal to or less than one half, the influence on the shock absorbing capacity due to the orientation of the impact surface of the impacted object that has impacted the bumper fascia is small.

It is possible to use a resin such as a thermoplastic resin or a thermosetting resin that is used in foaming molding in the resin that forms the resin molded material for forming the flexible legs and the rigid legs, and in terms of imparting advantageous shock absorbing capacity and in terms of facilitating the molding, it is possible to use a thermoplastic resin such as polystyrene, polypropylene, a polystyrene/polyethylene copolymer, or the like. In addition, when the absorber is formed by foaming a thermoplastic resin, after forming in plurality foamed resin particles that are pre-expanded at a prescribed increase rate by impregnating a foaming agent into plastic beads, a bead-shaped foamed molded body may be formed by filling the plurality of foamed resin particles in a metal die having the shape of the absorber and then thermally foaming and fusion molding these foamed resin particles. Alternatively, a foamed molded body may be formed by mixing plastic with a foaming agent and molding the foamed plastic by extrusion molding from a prescribed die. Examples of a foaming agent that can be used include a volatile foaming agent that produces a hydrocarbon such as butane or pentane, or an inorganic foaming agent that produces, for example, a carbon gas such as ammonium carbonate.

In addition, the resin molded material may be formed only by a resin and a foaming agent, but the resin molded material may also include additives such as a filler. In terms of sufficiently retaining the characteristics of the resin, the composition of each of the materials in the resin molded material can be set to: resin, 50 wt. % or greater (preferably, 65 wt. % or greater); and additives, 50 wt. % or less (preferably, 35 wt. % or less).

The density of the flexible legs is preferably 0.01 to 0.18 g/cm$^3$, more preferably, 0.018 to 0.07 g/cm$^3$, and yet more preferably, 0.02 to 0.03 g/cm$^3$. The density is preferably set equal to or greater than the lower limits because the compression load becomes appropriately large and advantageous compression load characteristics can be obtained, and thus the shock energy can be sufficiently absorbed. In contrast, the density is preferably set equal to or less than the upper limits because the compression load does not become too large, and the amount of the displacement of the flexible legs until reaching the "bottoming state", in which the compression load exceeds the permitted limit, becomes large, and thus the shock energy can be sufficiently absorbed.

The density of the crosslinking portions is preferably 0.01 to 0.18 g/cm$^3$, more preferably, 0.018 to 0.07 g/cm$^3$, and yet more preferably, 0.02 to 0.03 g/cm$^3$. The density is preferably set equal to or greater than the lower limits because the compression load becomes appropriately large and advantageous compression load characteristics can be obtained, and thus the shock energy can be sufficiently absorbed. In contrast, the density is preferably set equal to or less than the upper limits because the compression load does not become too large, and the amount of the displacement of the flexible legs until reaching the "bottoming state", in which the compression load exceeds the permitted limit, becomes large, and thus the shock energy can be sufficiently absorbed.

It is possible to use a resin such as a thermoplastic resin or a thermosetting resin that is used in the resin mold in the resin that forms the resin molded material for forming the rigid legs, and in terms of imparting an advantageous shock absorbing capacity and in terms of facilitating the molding, it is possible to use a thermoplastic resin such as polypropylene, polystyrene, or polyethylene or the like. The density of the rigid legs can be set, for example, to 0.9 to 1.2 g/cm$^3$ (more preferably, 1.0 to 1.1 g/cm$^3$).

The ratio of the length L1 of the crosslinking portions 50 in the front-back direction D1 to the length L0 of the absorber 10 in the front-back direction D1 is preferably 0.20 to 0.65, and more preferably, 0.40 to 0.50. This ratio is preferably set equal to or greater than the lower limits because the flexible legs and the rigid legs are sufficiently fastened together by the crosslinking portions, and in addition, even if the impact surface of the impacted object in a perpendicular cross-section deviates from the vehicle exterior side surface of the bumper fascia, the collapsing of the flexible legs and the rigid legs in the same direction becomes infrequent, and the shock energy can be sufficiently absorbed. The ratio is preferably set equal to or less than the upper limits because, as a result of the length L2 of the recessed portions 20 in the front-back direction being sufficiently long, the bending deformation of the rigid legs occurs sufficiently when the shock is imparted, and in addition, the reaction force that is applied to the impacted object from the absorber does not become excessive before the shock energy is sufficiently absorbed, and thus an advantageous shock absorbing capacity can be obtained. Note that the length L1 of the crosslinking portions in the front-back direction may be set, for example, to 6 to 105 mm, and the length L2 of the recessed portions 20 in the front-back direction maybe set to 9 to 120 mm.

The ratio of the thicknesses (L11 and L15 in FIG. 4) of the flexible legs 30 in the vertical direction D3 to the length L2 of the recessed portion 20 in the front-back direction is preferably 0.25 to 0.6, and more preferably 0.3 to 0.5. The ratio is preferably set equal to or greater than the lower limits because even if the impact surface of the impacted object in a perpendicular cross-section deviates from the vehicle exterior side surface of the bumper fascia, the collapsing of the flexible legs and the rigid legs in the same direction becomes infrequent, and the shock energy can be sufficiently absorbed. The ratio is preferably set equal to or less than the upper limits because the reaction force that is applied to the impacted object from the absorber does not become excessive before the shock energy has been sufficiently absorbed, and thus an advantageous shock absorbing capacity can be obtained. Note that the thicknesses L11 and L15 of the flexible legs in the vertical direction can be set, for example, to 5 to 40 mm.

The thickness L13 of the rigid legs 40 in the vertical direction D3 is preferably 1.0 to 3.0 mm, and more preferably, 1.8 to 2.2 mm. The thickness L13 is preferably set equal to or greater than the lower limits because the compression load is sufficiently large during the initial stage when the shock is imparted, and in addition, even if the impact surface of the impacted object in a perpendicular cross-section deviates from the vehicle exterior side surface of the bumper fascia, the collapsing of the flexible legs and the rigid legs in the same direction becomes infrequent, and thus the shock energy can be sufficiently absorbed. The thickness L13 is preferably set equal to or less than the upper limits because the bending deformation of the rigid legs occurs readily when the shock is imparted, and in addition, the compression load at the initial stage does not become excessive, and thus an advantageous shock absorbing capacity can be obtained. Note that the ratio of the thickness L13 of the rigid legs 40 in the vertical direction D3 to the length L0 of the absorber 10 in the front-back direction D1 can be set, for example, to 0.01 to 0.07 (more preferably, 0.02 to 0.05).

The ratio of the thicknesses (L12 and L14 in FIG. 4) of the recessed portions 20 in the vertical direction D3 to the length L0 of the absorber 10 in the front-back direction D1 are preferably 0.05 to 0.4, and more preferably, 0.08 to 0.34. The ratio is preferably set equal to or greater than the lower limits because the compression load during the initial stage when the shock is imparted does not become excessive since spaces that permit the bending deformation of the rigid legs can be sufficiently ensured, and a favorable shock absorbing capacity could thereby be obtained. The ratio is preferably set equal to or less than the upper limits because even if the rigid legs collapse when the shock is imparted, they strike against the flexible legs and are supported by the flexible legs, the compression load during the later period of the displacement of the rigid legs can be sufficiently maintained, and the shock energy can be sufficiently absorbed. Note that the thicknesses L12 and L14 of the recessed portions in the vertical direction are preferably 5 to 15 mm, and more preferably, 7.5 to 12.5 mm.

The ratio of the length L2 of the recessed portions 20 to the length L0 of the absorber 10 in the front-back direction is preferably 0.35 to 0.80, and more preferably 0.50 to 0.60. The ratio is preferably set equal to or greater than the lower limits because the bending deformation of the rigid legs when a shock is imparted is not hindered, and thus an advantageous shock absorbing capacity can be obtained. In addition, the ratio is preferably set equal to or less than the upper limits because even if the impact surface of the impacted object deviates from the vehicle exterior side surface of the bumper fascia, the collapsing of the rigid legs in the same direction becomes infrequent, and thus the shock energy can be sufficiently absorbed.

The diameter (d1 in FIG. 5) of the through hole, when viewed at the pair of substantially semicircular columnar through holes 52 that sandwich the rigid leg 40, is preferably within a range that is larger than the thickness L13 of the rigid leg and at the same time equal to or less than the sum of L12+L13+L14 of the thicknesses L12 and L14 of the recessed portions that sandwich a rigid leg and the thickness of the rigid leg L13. Thereby, the influence on the shock absorbing capacity due to the orientation of the impact surface of the impacted object that has impacted the bumper fascia is small.

(2) The Manufacturing Method for the Bumper Absorber

The rigid legs 40 can be molded by using various well-known technologies. For example, it is possible to form the rigid legs by supplying a granular raw material made of a thermoplastic resin such as polypropylene to an injection molding machine having an attached heater, heating and melting the raw material using the heater, injecting the melted thermoplastic resin into a predetermined metal die having the shape of a rigid leg and molding the same, cooling the metal die, and hardening the resin. In the case in which the rigid legs are formed by using a thermosetting resin, formation is possible by injecting a liquid thermosetting resin into a predetermined metal die, and then heating the metal die to harden the resin, or adding a hardening agent to a liquid thermosetting resin and injecting this resin into a metal die, and then hardening the resin after the passage of a predetermined amount of time. Of course, it is possible to form the rigid legs by extrusion molding, press molding, and the like.

FIG. 7 schematically shows a manufacturing method for the absorber 10. In this manufacturing method, the absorber 10 is manufactured by a plate insert mold, in which a mold having cavities that correspond to the flexible legs 30 and the crosslinking portions 50 is used. After the resin presets (resin molded body) that form the rigid legs 40 have been set in the mold, the cavity is filled with foamed resin particles, and the mold is fastened while being heated by using steam pressure.

To manufacture the absorber 10, a metal mold DI1 that molds the absorber 10 so as to be provided with the flexible legs 30, the rigid legs 40, and the crosslinking portions 50, and metal supporting portions DI2 that support the resin molded bodies at the positions of the rigid legs 40 by passing through the crosslinking portions 50 from the bumper fascia 80 side in the mold, are used. A metal die that has a plurality of steam vents having diameters that are smaller than the diameter of the bead-shaped resin particles (the foamed resin particles) and that conforms to the shape of the absorber 10 can be used for the mold DI1. This mold DI1 is provided with a main body portion DI1a and a lid portion DI1b, but molds that have a structure other than this may be used. The supporting portions DI2 are used in order to support the resin molded bodies 40 inside the mold DI1. Each supporting portion DI2 is provided with a plate-shaped main body portion DI2a that supports the portion of the resin plate on the reinforcement 70 side and a plurality of substantially semicircular column-shaped projecting portions DI2b that support the portion on the bumper fascia 80 side from the main body portion. Of course, supporting members that has structures other than this may be used. The supporting portions DI2 of the present embodiment are provided in plurality, and are structured such that each of the resin plates is sandwiched between two supporting members DI2. Here, each of the main body portions DI2a has a shape that conforms to the groove-shaped recessed portions 20, and each of the projecting portions DI2b has a shape that conforms to each of the through holes 52.

To manufacture the absorber 10, first, resin plates are placed in the mold DI1 at the positions of the rigid legs 40 and supported by the supporting portions DI2. Then, the resin molded material that includes the foaming agent is fed into the mold DI1. In addition, while forming through holes 52 in the crosslinking portions 50 at the positions of the supporting portions DI2, the resin molded material is foamed, and the crosslinking portions 50 and the flexible legs 30 are simultaneously formed and integrated with the resin plate. Thereby, the absorber is formed.

Here, when the bead-shaped resin particles (the foamed resin particles) that include the foaming agent are used as the resin molded material that includes the foaming agent, it is possible to form the absorber more easily by using thermoforming. For example, the foaming agent may be added to the particulate thermoplastic resin such as polypropylene and pre-expanded into a bead shape to form a plurality of bead-shaped resin particles. Note that the diameters of the steam vents in the mold are made smaller than the diameter of the bead-shaped resin particles. Next, the mold that accommodates the resin plates is filled with a plurality of the bead-shaped resin particles, and fastened. Furthermore, steam to raise the temperature is introduced into the mold by a prescribed heater up to a temperature that heats and melts the thermoplastic resin that forms the bead-shaped resin particles. Thereby, it is possible to heat the inside of the mold, the bead-shaped resin particles are further foamed, the bead-shaped resin particles are bound together while melting, and also bound to the resin plate to form the absorber. When the mold is opened after cooling the inside thereof, an absorber can be extracted in which the flexible legs 30 and the crosslinking portions 50 have been integrated and then further integrated with the rigid legs 40.

In order to adjust the density of the foamed resin molded body, the amount of foaming agent that is impregnated into the bead-shaped resin particles and the expansion ratio may be adjusted. For example, if the composition ratio of the foaming agent that is added to the particulate thermoplastic resin is increased, the expansion ratio will increase, and the density will thereby decrease. In contrast, if the composition ratio of the foaming agent that is added to the particulate thermoplastic resin is decreased, the expansion ratio will decrease, and the density will thereby increase. In addition, if the weight of the bead-shaped resin particles that fill the mold is increased, the expansion ratio will decrease, and the density will thereby increase. In contrast, if the weight of the bead-shaped resin particles that fill the mold is decreased, the expansion ratio will increase, and the density will thereby decrease.

In addition, in order to adjust L2, L12, and L14, which represent the size of the recessed portions 20, L11 and L15, which represent the size of the flexible legs 30, and L1, which represents the size of the crosslinking portions 50, the mold and the supporting portion may be set to a shape that conforms with these sizes. Note that the demolding of the absorber from the mold is facilitated if the thickness (corresponding to L12 and L14) of the main body portion DI1a of the supporting portion has a venting taper shape imparted thereto, in which the bumper fascia 80 side is slightly smaller than the reinforcement 70 side, and if the thickness of the projecting portion DI2b of the supporting portion in the vertical direction D3 has a venting taper shape imparted thereto, in which the bumper fascia 80 side is made slightly smaller than the reinforcement 70 side. Furthermore, various shapes may be considered for the through holes 52, and a substantially hemispherical cone shape or an angular columnar shape may be imparted to the supporting portion and a substantially hemispherical cone shape or an angular columnar shape or the like may be imparted to the through holes 52. Of course, various shapes may be considered for the projecting portions, and it is possible to dispose them at various intervals.

According to the present manufacturing method, the resin molded bodies are supported at the positions of the rigid legs inside the mold by the supporting portions, the crosslinking portions and the flexible legs are molded in the mold simultaneously, the crosslinking portions, the flexible legs, and the rigid legs are formed simultaneously, and thus the number of processing steps for the absorber can be reduced.

Here, when the projecting portions are not provided on the supporting members described above, the portion of the resin molded bodies forming the rigid legs that is buried in the crosslinking portions is not supported by the supporting member, and thus deformation may occur due to the heat of the steam during thermoforming and the foaming pressure of the foamed resin particles. In the manufacturing method of the present invention, the projecting portions, which project from the bumper reinforcement side to the bumper fascia side and support the resin molded bodies at the positions of the rigid legs, are provided on the supporting portions, and thus the force that supports the resin molded bodies due to the supporting portions increases, and deformation during molding does not easily occur. In addition, the fastening force between the foamed resin molded body and the resin molded body is not too strong, the bending deformation of the resin molded body readily occurs, and the shock absorbing capacity of the bumper absorber thereby increases.

Due to the above, it is possible to reduce the number of processing steps for the absorber and it is possible to improve the processing precision for the absorber, and thus it is possible to manufacture at a high efficiency a bumper absorber that has an advantageous processing precision.

In addition, the supporting portions pass through the crosslinking portions from the bumper fascia side to support the resin molded bodies at the positions of the rigid legs. Thus, deformation of the rigid legs up to the position of the bumper fascia side during molding does not easily occur. Furthermore, because the plurality of projecting portions is provided discontinuously in the transverse direction D2 of the vehicle, this point also makes deformation of the rigid legs during molding occur with difficulty.

Note that manufacturing methods for the bumper absorber other than the manufacturing method that has been described above can be considered. For example, a manufacturing method may be considered in which the bumper absorber is formed by forming the foamed resin molded body that forms the crosslinking portions and the flexible legs in advance, and then inserting the resin molded bodies afterward. In this case, when the insertion groove of the resin molded body is formed in the foamed resin molded body, it is possible to form the absorber easily by inserting the resin molded body afterward. Here, when considering the demolding characteristics of the foamed resin molded body, preferably the insertion groove has a vent taper shape imparted thereto.

(3) Operation and Effects of the Bumper Absorber

In this absorber 10, the buckling permitting spaces SP1 in which the rigid legs are not restricted are formed between the flexible legs 30, which are formed by foaming the resin molded material, and the rigid legs 40, which are formed by the resin molded material. Here, when an impacted object such as a pedestrian impacts the bumper fascia 80, the deformation of the rigid legs 40 is not hindered. Thus, as shown in FIG. 9, at the flexible legs 30, the reaction force (the compression load F1) that accompanies the increase in the displacement x thereof becomes large, while in contrast, at the rigid legs 40, the reaction force (the compression load F2) rapidly increases and reaches a peak during the initial stage, and subsequently, the reaction force rapidly decreases. The reaction force (the compression load F3) on the impacted object is equal to a reaction force that is a combination of the flexible legs 30 and the rigid legs 40, and thus, a substantially constant reaction force acts on the impacted object over a long period of the displacement of the absorber. The absorbed amount of the shock energy is equivalent to the amount of energy that is found by integrating the compression load F3 with respect to the displacement x until the bottoming state is reached, in which the compression load F3 exceeds the permitted limit compression load F4. Thus, it is possible to appropriately absorb the shock energy over a long period of the displacement of the absorber, and it is possible to obtain thereby an advantageous shock absorbing capacity.

In addition, the crosslinking portions 50 fasten the flexible legs 30 and the rigid legs 40 together while sealing at least half of the area of the opening OP1 between the flexible legs 30 and the rigid legs 40 on the bumper fascia 80 side. Thus, as shown in the lower portion of FIG. 6, the opening portion of the absorber 10 on the bumper fascia 80 side is small or absent.

Figure 24:
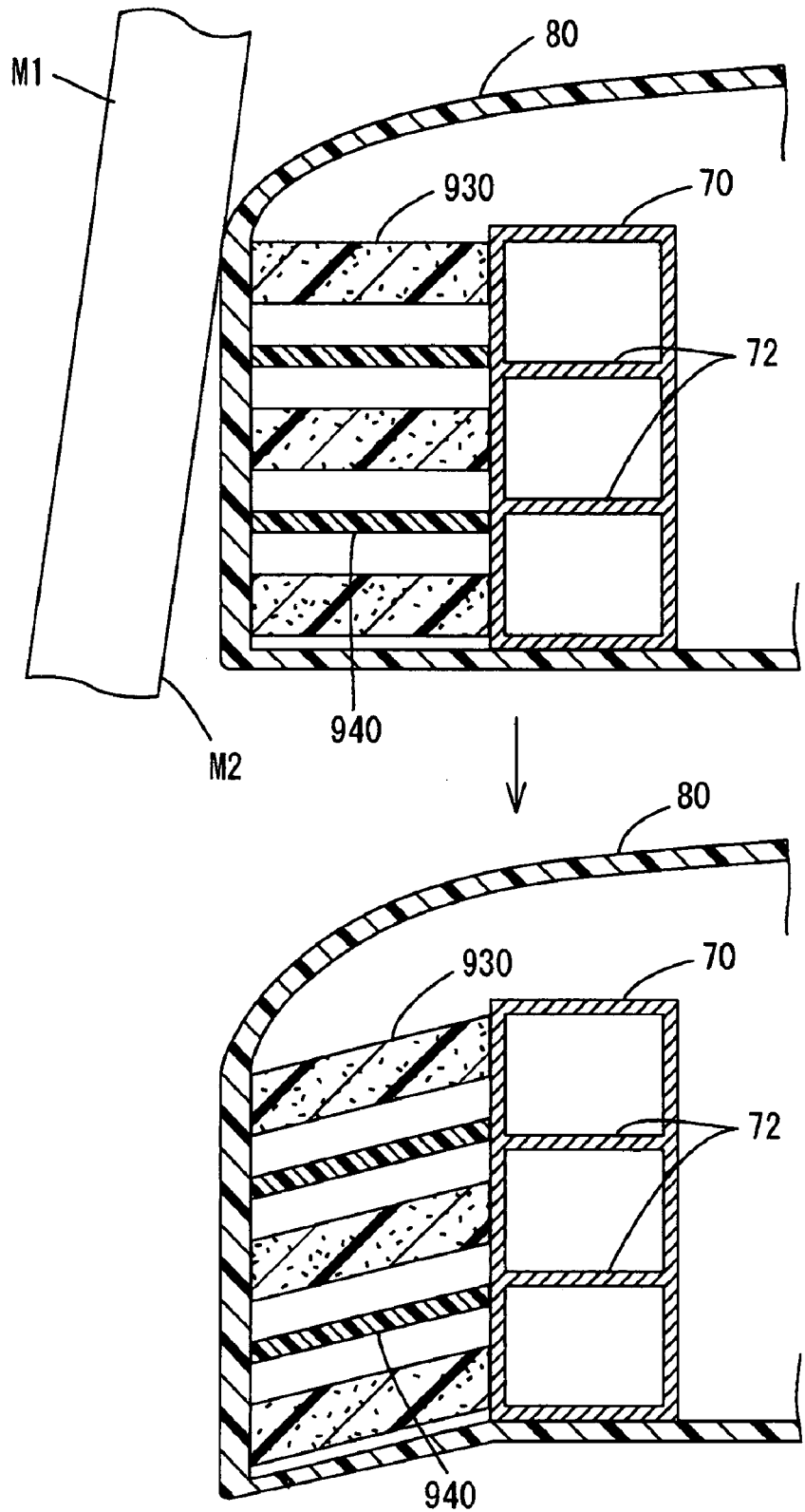
FIG. 24 is an exemplary illustration of a perpendicular cross-sectional view that schematically shows the arrangement when a shock is imparted to the bumper absorber according to the comparative examples.

Similar to a comparative example that is shown in FIG. 24, when a compression energy absorbing materials 930 and a plate-shaped buckling energy absorbing materials 940 are disposed at intervals while an absorber having large openings formed on the front side (the bumper fascia 80 side) is used, in the case in which an impact surface M2 of an impacted object M1 that has impacted the bumper fascia is not perpendicular to upper and lower surfaces of the compression energy absorbing materials 930 and upper and lower surfaces of the buckling energy absorbing materials 940, as a result of the load that is imparted during impact being received on a narrow portion of the absorber, the compression energy absorbing materials 930 and the buckling energy absorbing materials 940 collapse in either upward or downward, and it can be supposed that the shock absorbing capacity will be thereby reduced. The example in the figure shows the state in which, because the upper side of the impacted object M1 first impacts the bumper fascia 80, the front side of both energy absorbing materials 930 and 940 collapse downward. Even if the back portions of both energy absorbing materials are linked by linking members, in the absorber in which large openings are formed between both energy absorbing materials, both energy absorbing materials will collapse in either upward or downward during the initial stage of the displacement of the absorber, and it can be supposed that the shock absorbing capacity will be thereby reduced. In addition, even if the front portions of both energy absorbing materials are linked together by a plurality of columnar linking members such that the openings are not covered, the force that fastens both energy absorbing materials is weak, and thus, both energy absorbing materials collapse in either upward or downward during the initial stage of the displacement of the absorber, and it can be supposed that the shock absorbing capacity will be thereby reduced.

As shown in FIG. 8, in the absorber of the present invention, the flexible legs 30 and the rigid legs 40 are fastened together by the crosslinking portions 50 such that the openings OP1 are covered on the bumper fascia 80 side. As a result, even if the impact surface of the impacted object that has impacted the bumper fascia 80 is not perpendicular to the direction D1 that joins the reinforcement 70 and the bumper fascia 80, the imparted load during the impact is received over a wide area of the rigid legs 40, and thus, the phenomenon in which the flexible legs 30 and the rigid legs 40 collapse only in a certain direction is avoided. Therefore, the influence on the shock absorbing capacity due to the orientation of the impact surface of the impacted object is small.

Furthermore, it is not necessary to form a structure on the bumper fascia 80 that supports the bumper fascia 80 side of the flexible legs 30 and the rigid legs 40. Therefore, according to the bumper absorber of the present invention, it is possible to reduce the influence on the shock absorbing capacity due to the orientation of the impact surface of the impacted object that has impacted the bumper fascia without making the structure of the bumper fascia complicated.

(4) Second Embodiment

Figure 10:
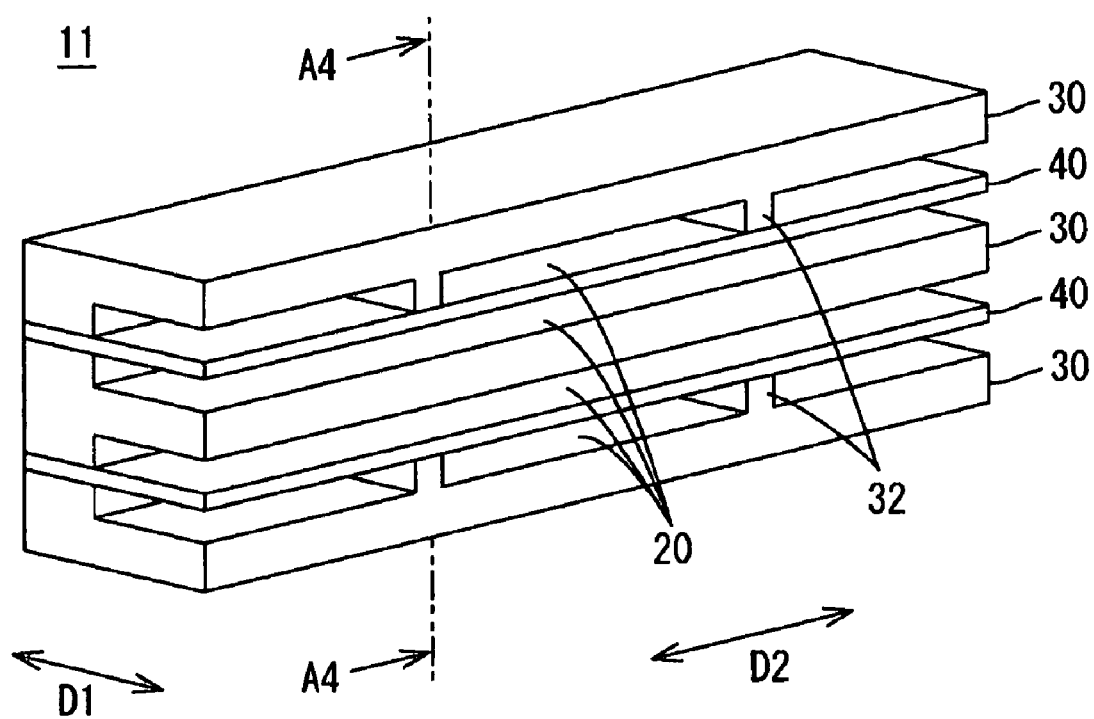
FIG. 10 is an exemplary illustration of a perspective view that shows the absorber of a second embodiment when viewed from the back side.
Figure 11:
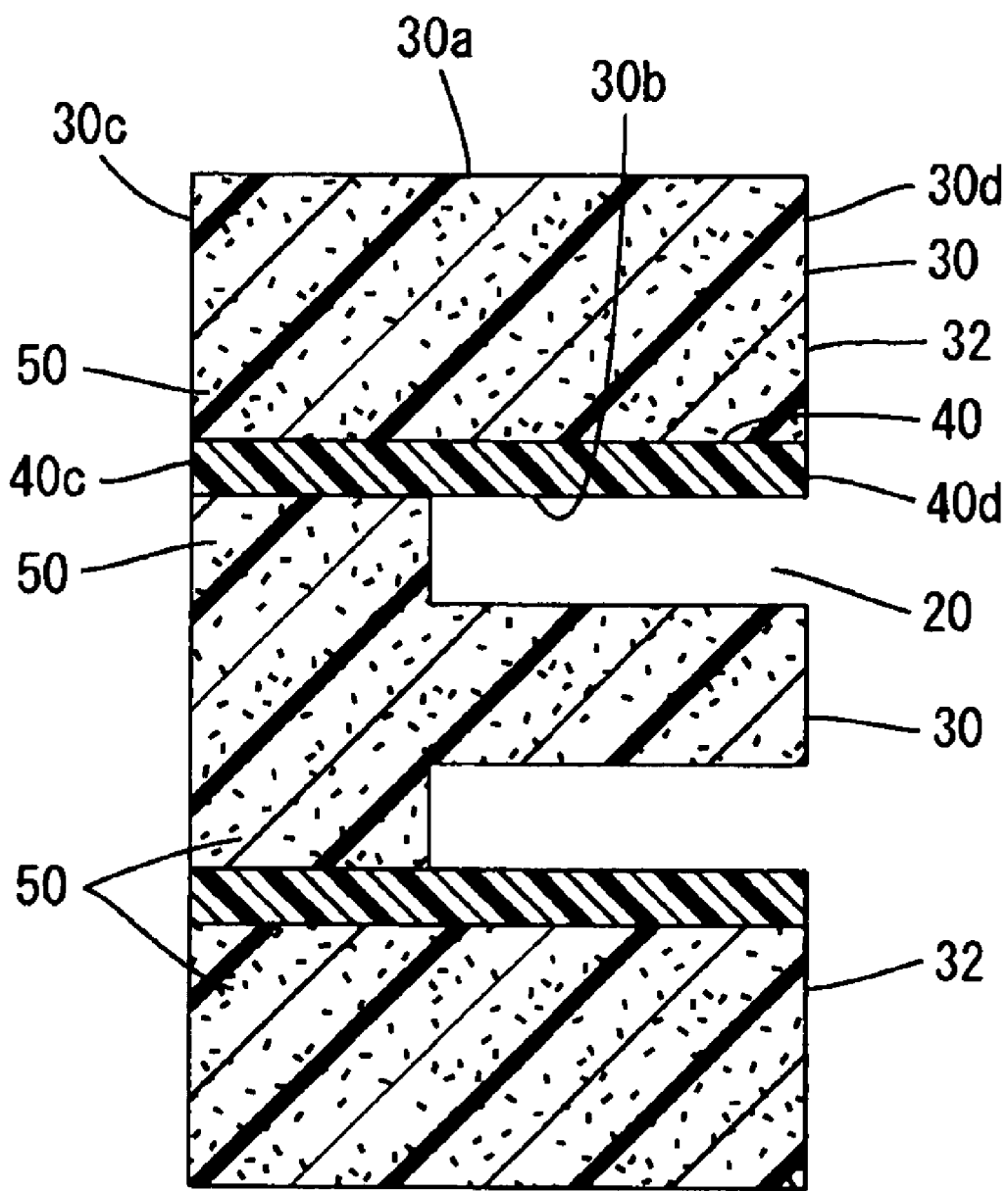
FIG. 11 is an exemplary illustration of a perpendicular cross-sectional view that shows the cross section of the absorber along line A4-A4 in FIG. 9.

Similar to the bumper absorber 11 that is shown in FIG. 10 and FIG. 11, convex portions 32 that abut the plate-shaped rigid legs 40 may be formed in the recessed portions 20. In the example in the figures, each of the rigid legs 40 is disposed so as to be sandwiched between a pair of flexible legs 30 in the vertical direction. Here, one of the pair of flexible legs 30 that sandwich each of the rigid legs (in the figures, the flexible leg in the middle in the vertical direction D1) is disposed separated so as not to contact a rigid leg 40. In contrast, on the other of the pair of flexible legs 30 that sandwich each of the rigid legs (in the figures, the uppermost flexible leg and the lowermost flexible leg), convex portions 32, which extend in a direction that differs from the direction D1 that joins the reinforcement 70 and the bumper fascia 80 and abut the rigid legs 40, are formed inside the recessed portions 20. Note that in the case in which the flexible legs and the crosslinking portions are integrally formed, it can be said that convex portions 32, which are fastened to the rigid legs 40 by projecting toward the reinforcement 70 into the recessed portions 20, are formed in the crosslinking portions 50. In this absorber 11, a plurality of convex portions 32 is formed discontinuously in the transverse direction D2 of the vehicle on the uppermost flexible leg 30 and the lowermost flexible leg 30.

During the course of carrying out actual experiments, it was understood that the rigid legs 40 would readily bend towards the side that was in contact with the convex portions 32 more than the side that was separated from the flexible legs. It is conjectured that because the convex portions are fastened to the rigid legs, the rigid legs are restricted by the convex portions and bend in the direction of the side that is attached to the convex portions.

Due to the above, when a shock load is applied to the absorber, it is possible to further stabilize the shock absorbing capacity because the bending direction of the rigid legs can be actively restricted to the direction in which they are attached to the convex portions.

In addition, in the case in which, similar to the present embodiment, first rigid legs (the third energy absorbing portions) and second rigid legs (the fourth energy absorbing portions) are provided, and the convex portions that contact the first rigid legs and the convex portions that contact the second rigid legs are provided on opposite sides, because the bending direction of the rigid legs is different, it is possible to improve the stability of the shock absorbing capacity.

In particular, when the first and second rigid legs are separated from the flexible legs that are sandwiched by the first and second rigid legs, and convex portions are formed that extend from the pair of flexible legs that sandwich the first and second rigid legs as a whole in the vertical direction D1 toward the first and second rigid legs and that are respectively fastened to the first and second rigid legs, because the bending deformation of the rigid legs occurs such that the first and second rigid legs bend toward the direction of mutual separation, it is possible to suppress the reduction of the shock absorbing capacity due to the bending deformation of the rigid legs being hindered while a shock load is applied.

(5) Third Embodiment

Figure 12:
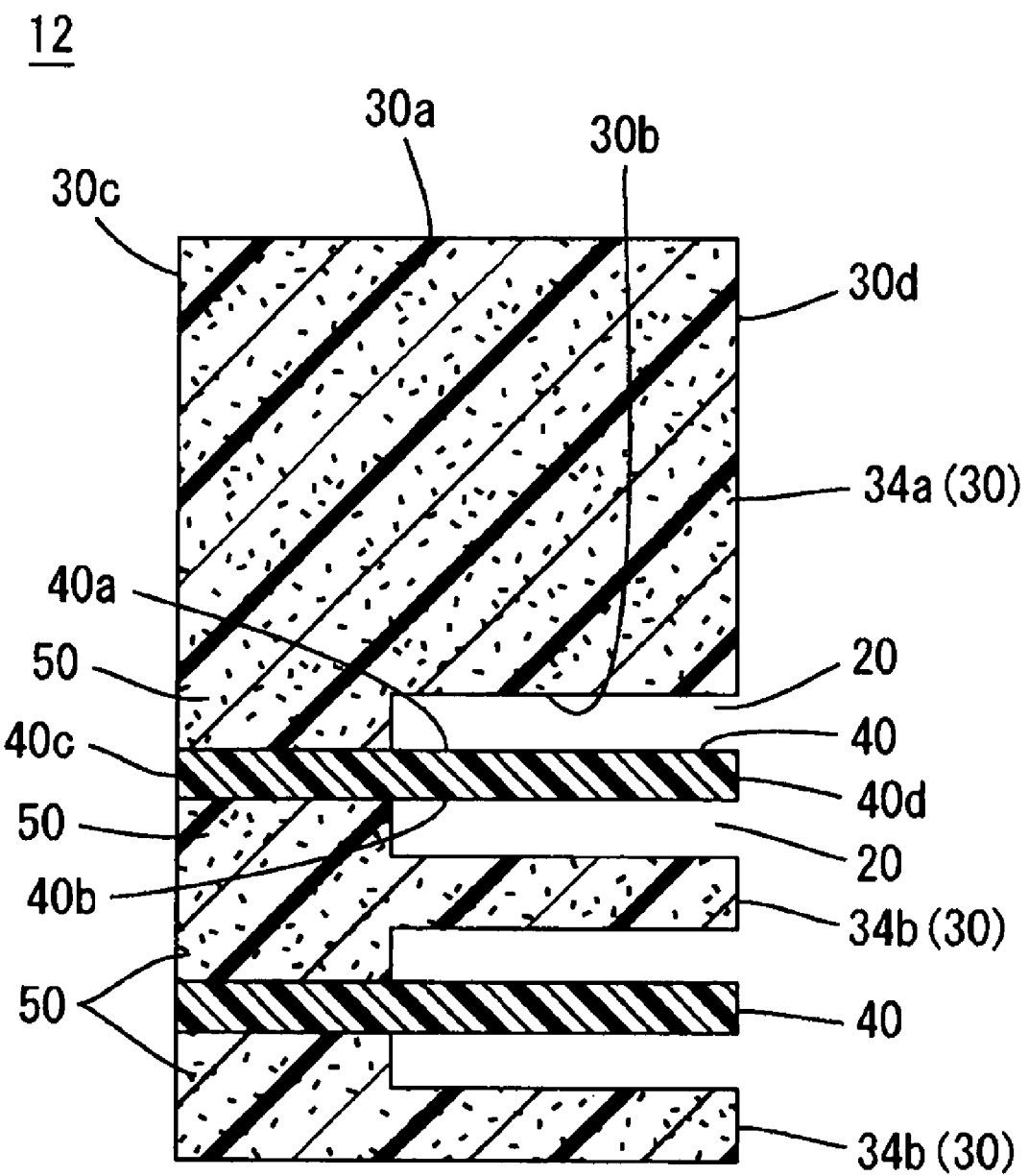
FIG. 12 is an exemplary illustration of a perpendicular cross-sectional view that shows the cross section of the absorber of a third embodiment along a line corresponding to line A1-A1 in FIG. 2.

Similar to a bumper absorber 12 that is shown in FIG. 12, the plate-shaped rigid legs 40 and the recessed portions 20 may be provided offset downward in the absorber 12. For example, when the rigid legs 40 and the recessed portions 20 are present only on the lower half of the absorber 12 in the vertical direction, they can be said to be offset downward. The example in the figure shows that the vertical thickness of an uppermost flexible leg 34a in the vertical direction is thicker than the thickness of middle and lowermost flexible legs 34b in the vertical direction. Although the upper side of the absorber 12 is positioned near the knees of a pedestrian, it is possible to reduce the slope of the rising load at the position near the knees because the rigid legs 40, for which the slope of the rising load on the displacement-load curve during impact becomes comparatively large, is offset downward. Therefore, it is possible to lower the Tibia Index of the pedestrian, and it is possible thereby to reduce the shock that is imparted to the knees of a pedestrian.

(6) Fourth Embodiment

Figure 13:
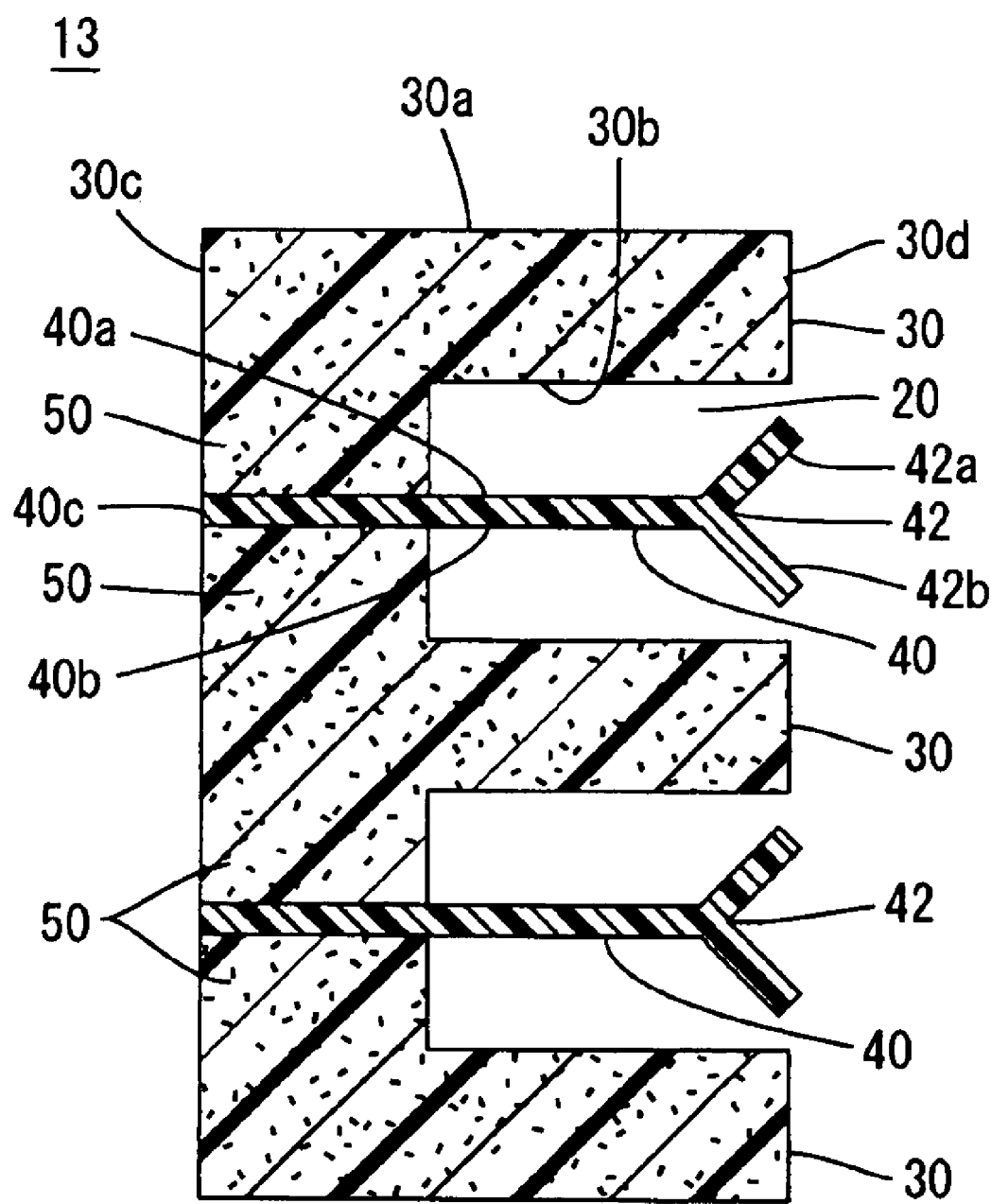
FIG. 13 is an exemplary illustration of a perpendicular cross-sectional view that shows the cross section of the absorber of a fourth embodiment along a line corresponding to line A1-A1 in FIG. 2.

Similar to a bumper absorber 13 that is shown in FIG. 13, the substantially plate-shaped rigid legs 40 extend from the bumper fascia 80 side towards the reinforcement 70, and along this extension, after branching at a branching portion 42 extends in a plurality of directions that differ from the direction of extension (the front-back direction D1). Here, the rigid legs 40 are disposed so as to contact the reinforcement 70 at the distal end portions 42a and 42b that have branched at the branching portion 42 in each of the extension directions. Although these rigid legs 40 branch into a "Y" shape in cross-section at a predetermined angle at the perpendicular cross-section that is defined in the front-back direction D1, various structures can be considered for rigid legs that have a branching portion, such as rigid legs in which the distal ends thereof have, from the branching portion, a "U" shape in cross-section or a semicircular shape in cross-section.

According to the structure described above, even if the impact surface of the impacted object is not perpendicular to the direction that joins the reinforcement 70 and the bumper fascia 80, an action is readily obtained in which the collapse of the rigid legs is prevented due to the portion that branches along the rigid legs 40 being crushed. Therefore, it is possible to further stabilize the shock absorbing capacity.

(7) Fifth Embodiment

Figure 14:
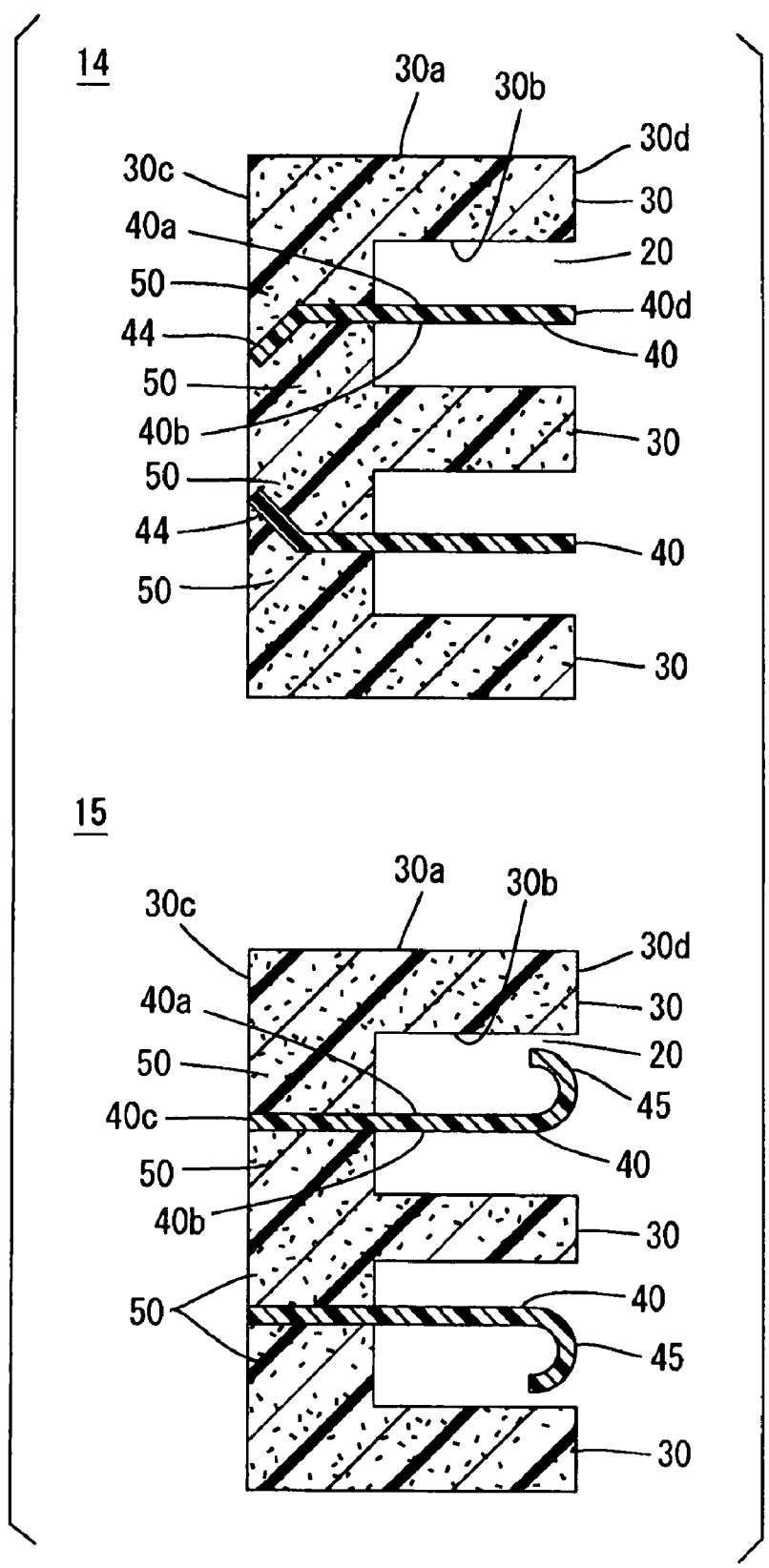
FIG. 14 is an exemplary illustration of a view that shows perpendicular cross-sectional views that illustrate the cross sections of the absorber of a fifth embodiment along a line corresponding to line A1-A1 in FIG. 2.

Similar to a bumper absorber 14 that is shown in the upper portion of FIG. 14, the substantially plate-shaped rigid legs 40 extend from the reinforcement 70 side toward the bumper fascia 80, and the distal end portion (the front edge portion) thereof may be formed so as to have a curved portion 44 that curves in a vertical direction. As shown in the figure, a first rigid leg and a second rigid leg are provided, and when the curved portions 44 of the first and second rigid legs bend in mutually differing directions, the curving directions of the rigid legs when the shock is imparted to the absorber differ, and thus it is possible to improve the stability of the shock absorbing capacity. In particular, when the distal end portions of the first and second rigid legs are bent in a direction in which they approach each other, a bending deformation of the rigid legs occurs such that the first and second rigid legs bend in a direction of mutual separation when the shock load is applied. Thus, it is possible to suppress a reduction in the shock absorbing capacity due to the bending deformation of the rigid legs being hindered.

The substantially plate-shaped rigid legs 40, similar to a bumper absorber 15 that is shown in the lower portion of FIG. 14, extend from the bumper fascia 80 side toward the reinforcement 70, and the distal end portion (the back edge portion) thereof may be formed so as to have a curve portion 45 that curves in a vertical direction. As shown in the figure, when a first rigid leg and a second rigid leg are provided and the curved portions 45 of the first and second rigid legs bend in mutually differing directions, because the bending direction of the rigid legs differs when a shock is imparted to the absorber, it is possible to improve the stability of the shock absorbing capacity. In particular, when the distal ends of the first and second rigid legs bend in a direction so as to become more distant from each other, the bending deformation of the rigid legs occurs such that the first and second rigid legs bend in a direction of mutual separation, and thus it is possible to suppress a reduction in the shock absorbing capacity due to the bending deformation of the rigid legs being hindered.

(8) Sixth Embodiment

Figure 15:
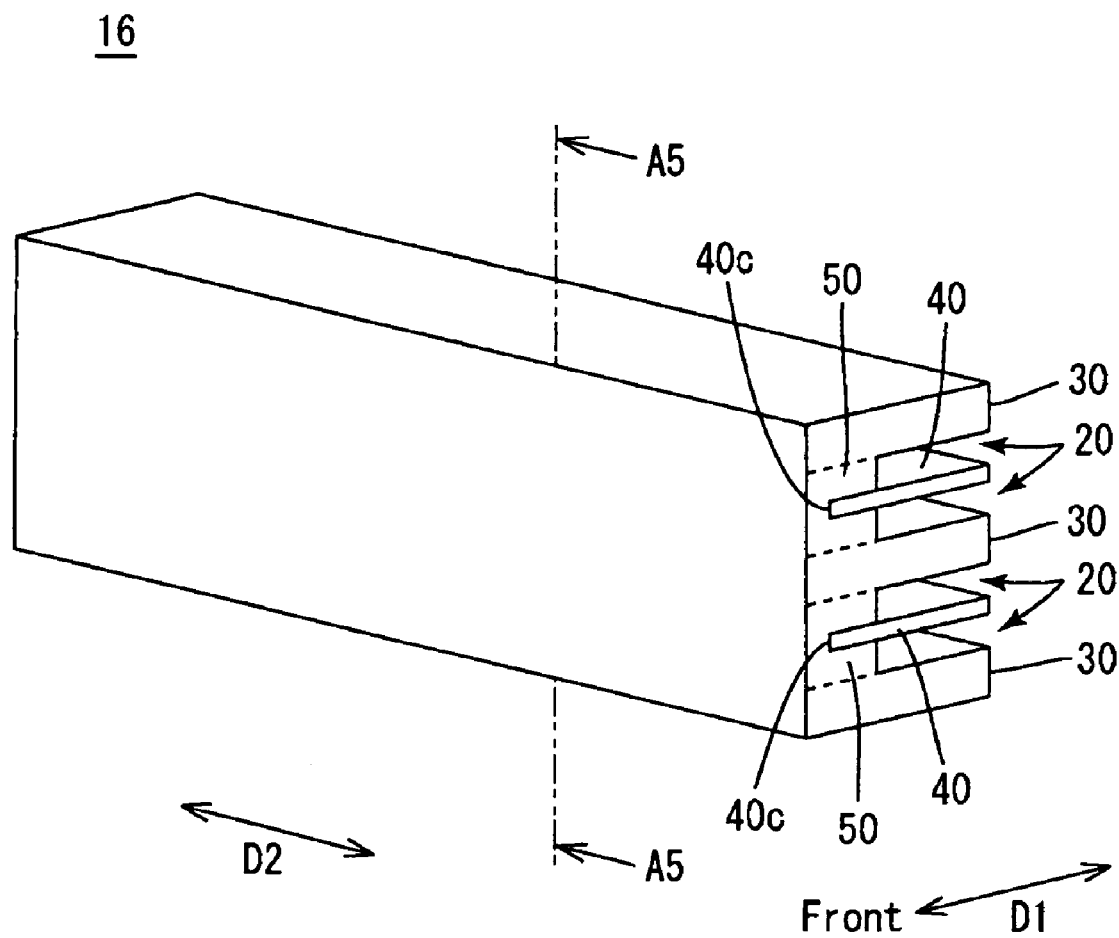
FIG. 15 is an exemplary illustration of a perspective view that shows the absorber of a sixth embodiment when viewed from the front side.
Figure 16:
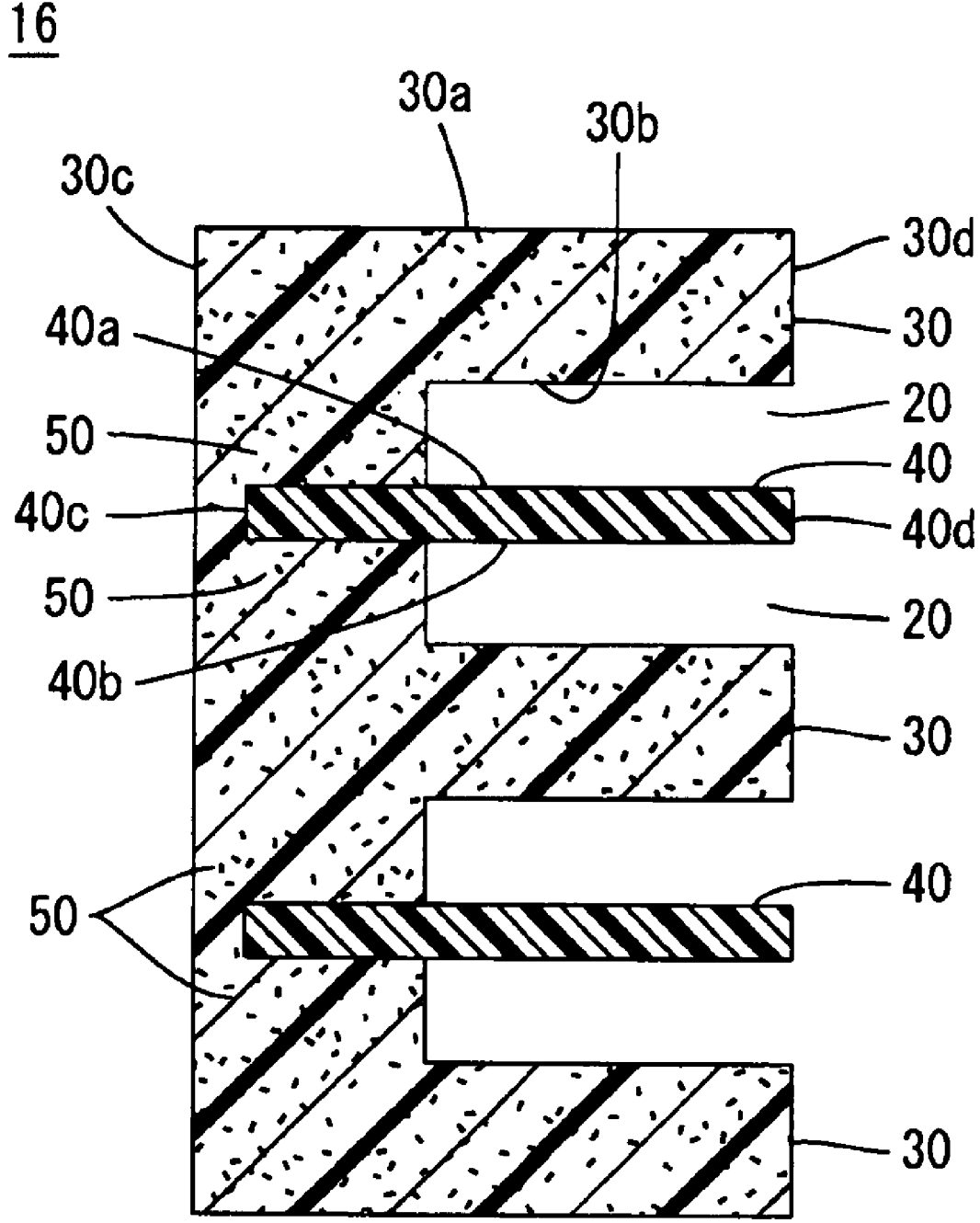
FIG. 16 is an exemplary illustration of a perpendicular cross-sectional view that shows the cross section of the absorber along line A5-A5 in FIG. 15.

Similar to a bumper absorber 16 that is shown in FIG. 15 and FIG. 16, the crosslinking portions 50 may cover the edge portions 40c of the plate-shaped rigid legs 40 on the bumper fascia 80 side to separate the rigid legs 40 from the bumper fascia 80. The crosslinking portions 50 enclose the front edge portion 40c of the rigid legs, and the rigid legs 40 are covered by the foamed resin molded body that forms the crosslinking portions, without passing through the crosslinking portions 50. Thus, the shock load that is imparted to the absorber 16 is transmitted to the rigid legs 40 after having been momentarily received by the crosslinking portions 50. Thereby, the shock load is readily received by the rigid legs 40 as a whole, and not only by a portion of the rigid legs 40. Therefore, it is possible to provide a bumper absorber that can receive the imparted load during an impact over the wide surfaces of the rigid legs.

(9) Seventh Embodiment

Figure 17:
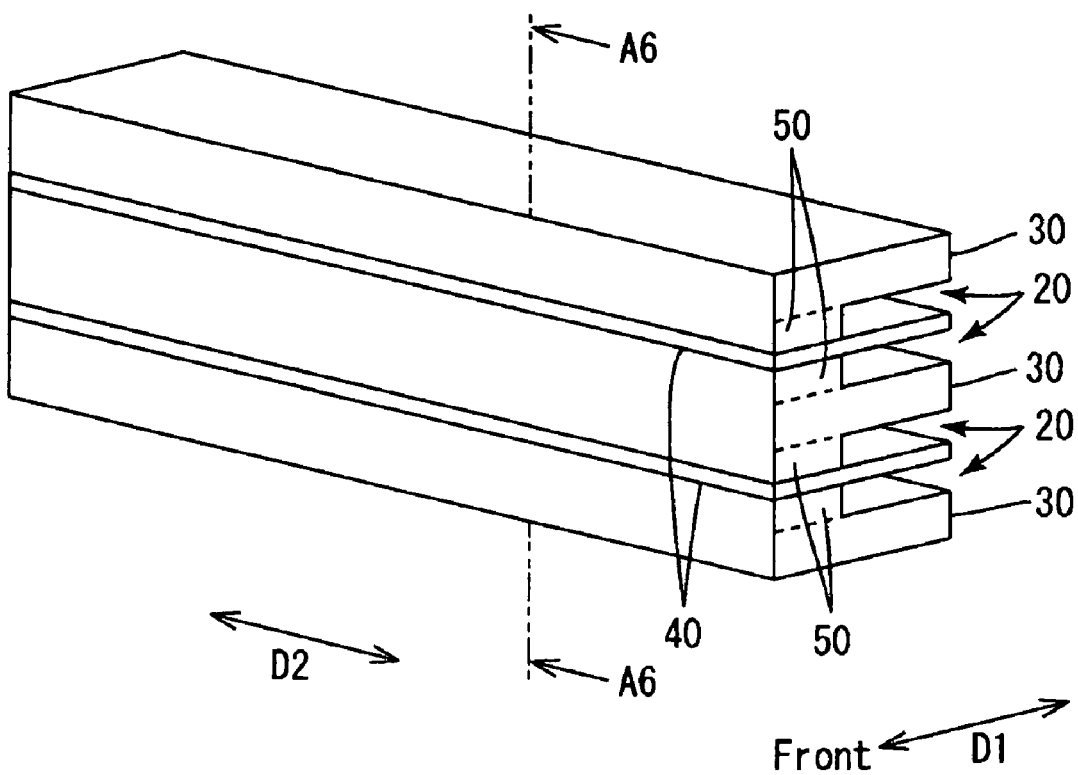
FIG. 17 is an exemplary illustration of a perspective view that shows the absorber of a seventh embodiment when viewed from the front side.
Figure 18:
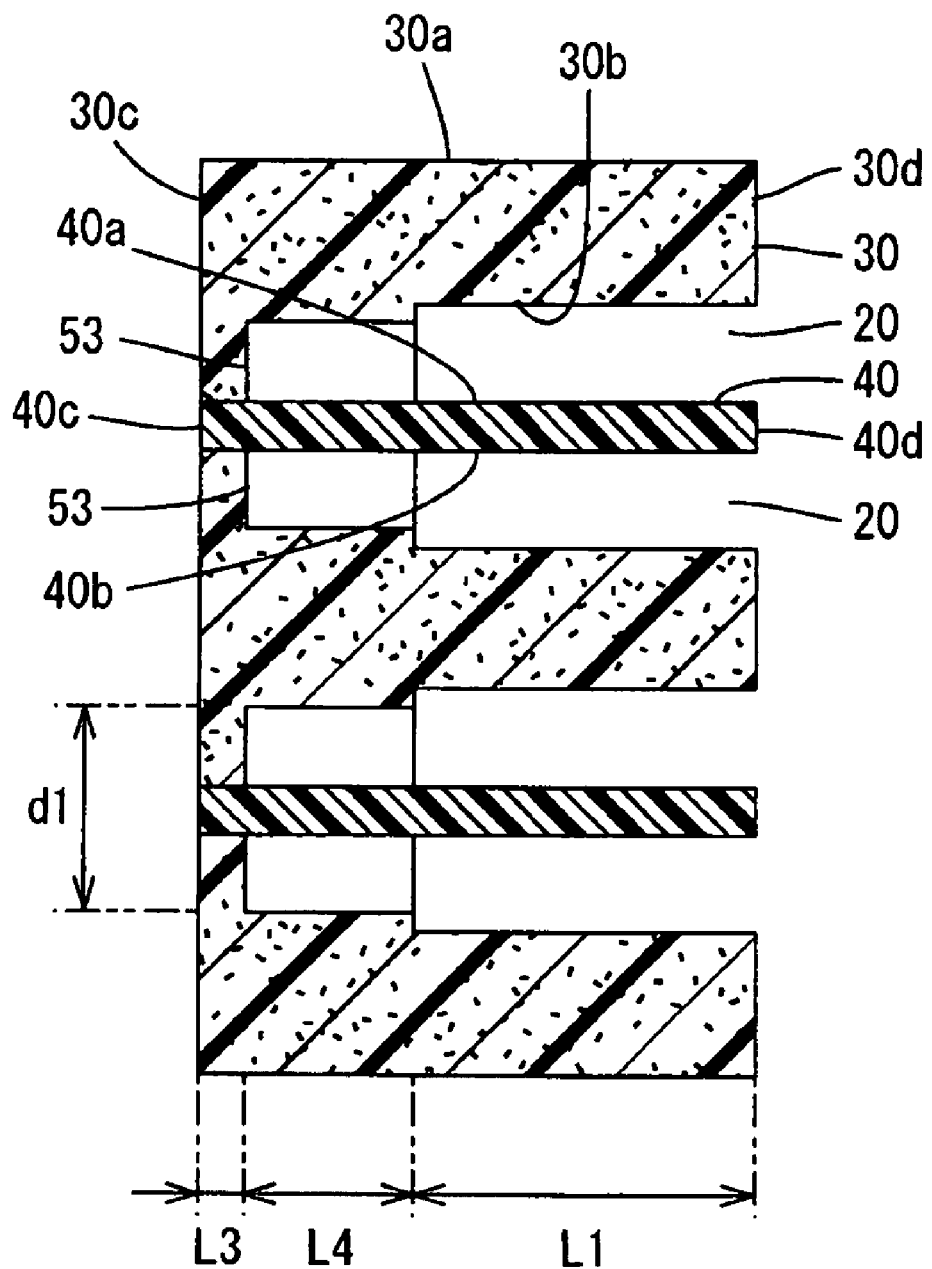
FIG. 18 is an exemplary illustration of a perpendicular cross-sectional view that shows the cross section of the absorber along line A6-A6 in FIG. 17.

Similar to a bumper absorber 17 that is shown in FIG. 17 and FIG. 18, the flexible legs 30 and the rigid legs 40 may be fastened together while the crosslinking portions 50 completely cover the openings OP1 between the flexible legs and the rigid legs on the bumper fascia 80 side. In the example in FIG. 18, holes 53 do not open into the front surface of the crosslinking portions 50 because a supporting portion DI2 is used in which the projecting portions DI2b extend so as to be slightly shorter than the front edge portion 40c of the rigid legs toward the reinforcement 70 side when the absorber 17 is formed. Note that the length L4 of the holes 53 in the front-back direction D1 and the thickness L3 of the crosslinking portions 50 in the front-back direction D1 in the front side of the hole 53 may be set depending on the shock absorbing capacity of the absorber 17, but the deformation of the rigid legs 40 does not easily occur during molding when L4>L3.

According to the structure described above, because the flexible legs and the rigid legs are fastened together by the crosslinking portions on the bumper fascia side and there are no opening portions present in the absorber on the bumper fascia side, it is possible to avoid the phenomenon in which the flexible legs and the rigid legs collapse only in a certain direction even if the impact surface of the impacted object is not perpendicular to the direction that joins the bumper reinforcement and the bumper fascia. Therefore, it is possible to reduce the influence on the shock absorbing capacity due to the orientation of the impact surface of the impacted object.

(10) Eighth Embodiment

Figure 19:
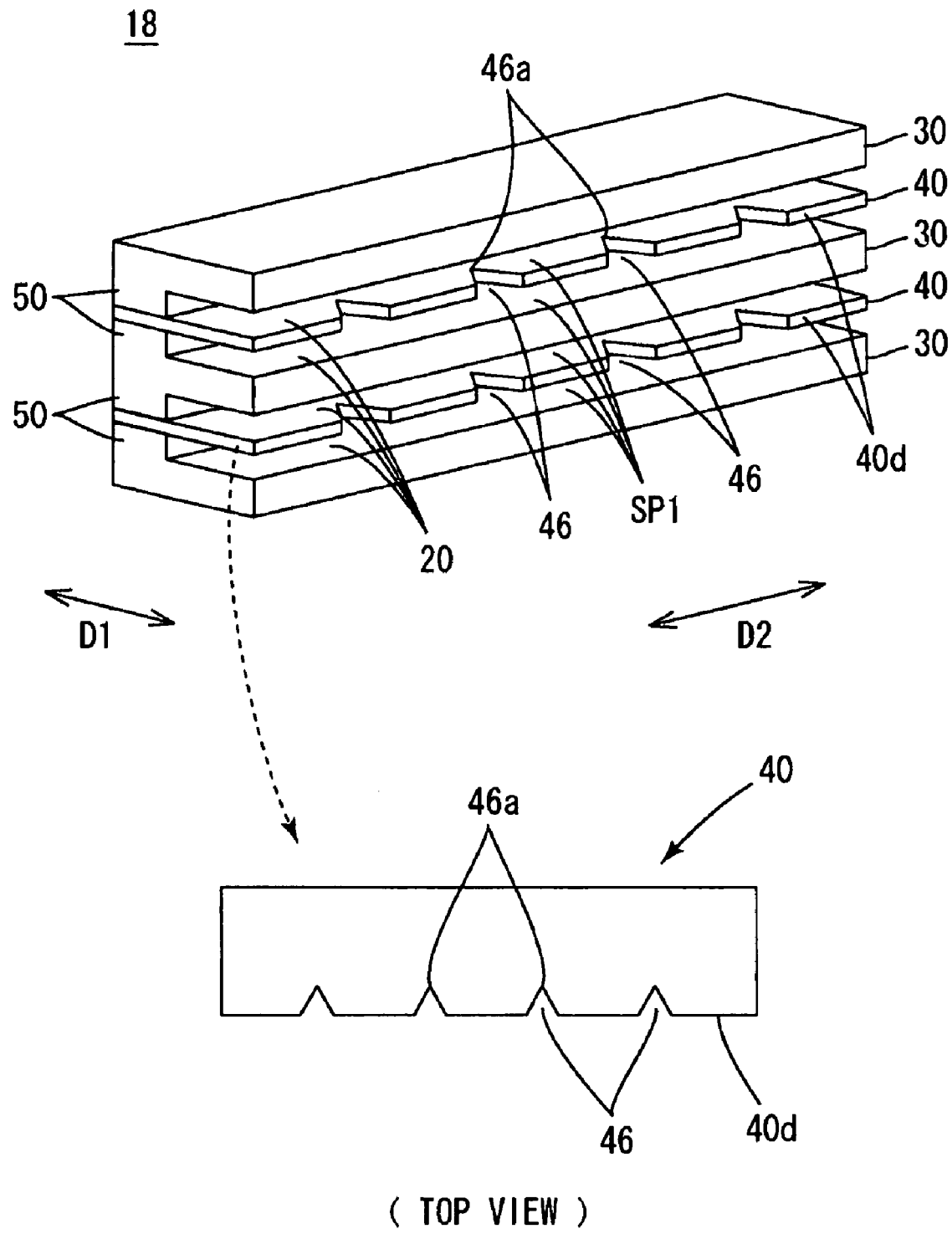
FIG. 19 is an exemplary illustration of a perspective view that shows the absorber of an eighth embodiment when viewed from the back side.

Similar to a bumper absorber 18 that is shown in FIG. 19, notched portions 46 having a shape in which a portion is cut out towards the reinforcement 70 may be formed on the back edge portions 40d of the substantially plate-shaped rigid legs 40. A plurality of notched portions 46 disposed intermittently towards the transverse direction D2 of the vehicle are provided on these rigid legs 40, and each of the notched portions 46 is formed into an isosceles triangle shape in which the bumper fascia 80 side serves as a vertex (a vertex 46a) when viewed from above. Of course, various shapes can be considered for the notched portions. Note that the rigid legs are disposed such that a portion of each back edge portion 40d, on which the notched portion 46 is not formed, contacts the reinforcement 70.

According to the structure described above, because the rigid legs 40 readily undergo bending deformation centered on the vertex 46a when a shock is imparted, it is possible to further stabilize the shock absorbing capacity. Here, when the vertex 46a of each of the notches is inside the recessed portions 20, the origin of the bending deformation of the rigid legs when a shock is imparted readily becomes the portion of the vertex 46a. It is possible to control the shock absorbing capacity by adjusting the position of the vertex 46a in the front-back direction D1. In particular, when the vertex 46a of each of the notched portions is at the interface portion between the crosslinking portions 50 and the recessed portions 20, because the origin of the bending deformation of the rigid legs readily occurs at the portion of the vertex 46a more reliably, it is possible to further stabilize the shock absorbing capacity.

(11) EXAMPLES

Below, the present invention will be explained specifically with reference to examples. However, the present invention is not limited by these examples.

Example 1

A resin plate (cut from a polypropylene resin NJ602G made by SunAllomer, Ltd.) consisting of polypropylene that was 44 mm long in the front-back direction, 200 mm long in the transverse direction of the vehicle, and 2.0 mm thick was used for the resin molded body of the rigid legs.

Bead-shaped polypropylene pre-expanded particles (a $\phi$ of 3 mm; density of 0.03 g/cm$^3$; and an expansion ratio of 30 times) made by JSP Corporation were used for the foamed resin particles.

The external shape of the absorber sample was substantially a parallelepiped, the absorber was provided with three flexible legs and two rigid legs, the flexible legs and the rigid legs were disposed alternately, the front side of the flexible legs and the front side of the rigid legs were joined, and crosslinking portions that fasten the flexible legs and the rigid legs were formed. Note that through holes were not formed in the crosslinking portions. Here, the length of the absorber sample in the front-back direction was 44 mm, the length of the absorber sample in the transverse direction of the vehicle was 200 mm, the length L2 of each of the recessed portions in the front-back direction was 25 mm (the length L1 of the crosslinking portions in the front-back direction was 19 mm), and the lengths L12 and L14 of each of the recessed portions in the vertical direction were all 7.5 mm, and the thicknesses L11 and L15 of each of the rigid legs in the vertical direction were all 22 mm. Therefore, the length of the absorber sample in the vertical direction was 100 mm.

First, the resin plates were inserted into a mold that had a plurality of vent holes at the positions of the rigid legs, next the mold was filled with a plurality of foamed resin particles, high temperature steam was introduced into this mold from the vent holes, the plurality of foamed resin particles were foamed and molded such that the density of the parts of the flexible legs and the crosslinking portions was 0.03 g/cm$^3$, and thereby the absorber samples of the examples were integrally formed. Two of the samples were molded.

Comparative Example

A resin molded body for the rigid legs and the foamed resin particles that were identical to those in the above examples were used.

A sample having a structure that was the reverse in the front-back direction of the examples described above was used for the absorber sample. Specifically, the external shape of the absorber sample was a substantially rectangular parallelepiped, the absorber was provided with three flexible legs and two flexible legs, the flexible legs and the rigid legs were disposed alternately, and the back sides of the flexible legs and the back sides of the rigid legs were joined, and crosslinking portions that fasten the flexible legs and the rigid legs together were formed. Here, the length of the absorber sample in the front-back direction was 44 mm, the length of the absorber sample in the transverse direction of the vehicle was 200 mm, the length L2 of each of the recessed portions in the front-back direction was 25 mm, the lengths L12 and L14 of each of the recessed portions in the vertical direction were all 7.5 mm, and the thicknesses L11 and L15 of each of the flexible legs in the vertical direction was 22 mm. In addition, the absorber sample was integrally formed in the same mold as example 1. Two samples were molded.

Experimental Method

A polypropylene injection molded component (thickness: 3 mm) was used as a bumper cover material equivalent, where the dimensions were set to an experimental size (the length in the transverse direction of the vehicle was 200 mm, the length in the vertical direction in examples 1 and 3 was 100 mm, and in example 2 was 90 to 130 mm).

For the compression load measuring apparatus, an apparatus was used that has a parallelepiped shaped receiving fixture for attaching the absorber sample and a leg-shaped impactor that moves horizontally at a constant speed of 20 km/h toward the receiving fixture. The leg-shaped impactor was made of S45C steel and had a $\Phi$75×300 mm cylindrical shape. A load sensor for measuring the compression load F was included in the leg-shaped impactor, and the compression load F was detected according to the movement position of the impactor by the control apparatus (not illustrated). The displacement x of the absorber sample was set to the movement distance from the position at which the leg-shaped impactor comes into contact with the absorber sample.

The end portions of the flexible legs and the rigid legs on the reinforcement side were abutted against the receiving fixture of the compression load measuring apparatus described above, each of the absorber samples of example 1 and the comparative example were installed in sequence, and the bumper cover (bumper fascia) material equivalent was brought into contact with and disposed on the front surface of the absorber sample.

Figure 20:
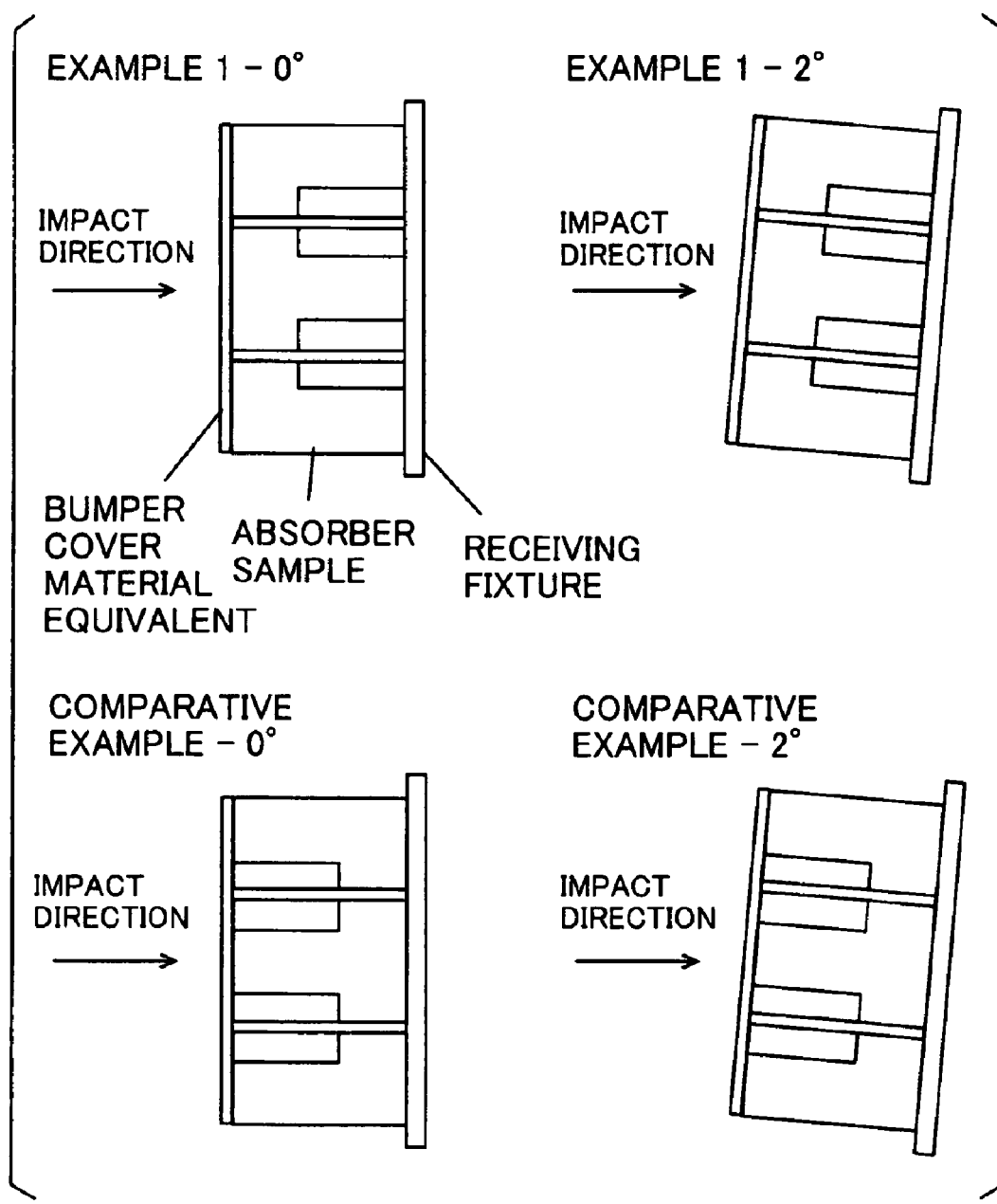
FIG. 20 is an exemplary illustration of a side view that schematically shows a method of measuring the shock absorbing capacity.

As shown in the upper portion of FIG. 20, for each of the absorber samples in example 1, ones in which the direction of extension of the flexible legs and the rigid legs was in the horizontal direction (the angle with respect to the horizontal direction was 0°) and ones in which the direction of extension of the front side of the flexible legs and the rigid legs was slightly raised so as to be offset 2° from the horizontal direction were prepared. Similarly, as shown in the lower portion of the figure, for each of the absorber examples in the comparative example, ones were prepared in which the direction of extension of the flexible legs and the rigid legs was in the horizontal direction and ones in which the direction of extension was offset by 2° were prepared.

For each of the absorber samples on which a bumper cover material equivalent was disposed on the front side thereof, the leg-shaped impactor was moved horizontally towards the receiving fixture, impacted from the front, and the compression load F was detected according to the movement position of the impactor. In addition, the compression loads (unit: kN) with respect to the displacement x (unit: mm) of the test samples were graphed.

Test Results

FIG. 21 shows the results of graphing the compression load with respect to the displacement of each of the test samples, where the upper portion shows the results for example 1 and the lower portion shows the results for the comparative example. During the initial stage (the stage in which the displacement x was approximately 0 to 10 mm) in which the impactor impacted the absorber sample, in both cases in which the direction of extension was 0° and 2°, the slope of the compression load with respect to the displacement x in example 1 was larger than the slope of the compression load with respect to the displacement x in the comparative example. In addition, in example 1, the compression loads rose between 4 to 5 kN, whereas in the comparative example, the compression loads rose only approximately 3 kN. Thereby, it was confirmed that even when there was a bumper fascia on the front surface of the absorber, if the openings between the flexible legs and the rigid legs on the bumper fascia side were not covered, the absorbed amount of the impact energy during the initial stage in which the shock force acted was small. In contrast, it was confirmed that if the openings between the flexible legs and the rigid legs on the bumper fascia side were covered, the absorbed amount of impact energy during the initial stage in which the shock force acted was large.

In addition, in the comparative example, during the initial stage in which the displacement x was approximately 0 to 10 mm, the slope of the compression load with respect to the displacement x at an angle of 2° became smaller than the slope of the compression load with respect to the displacement x at an angle of 0°. If the openings between the flexible legs and the rigid legs on the bumper fascia side were large, in the case in which the impact surface of the impacted object was not perpendicular to the direction of extension of the flexible legs and the rigid legs, it is conjectured that the shock absorbing capacity will be reduced due to the flexible legs and the rigid legs collapsing either upward or downward in the same direction.

In contrast, in example 1, during the initial stage in which the displacement x was approximately 0 to 10 mm, the slope of the compression load with respect to the displacement x at an angle of 2° was substantially the same as the slope of the compression load with respect to the displacement x at an angle of 0°. If the openings between the flexible legs and the rigid legs at the bumper fascia side were covered, even in the case in which the impact surface of the impacted object was not perpendicular to the direction of extension of the flexible legs and the rigid legs, because the imparted load was received over a wide surface of the rigid legs, the phenomenon in which the flexible legs and the rigid legs collapse only in a certain direction was avoided, and it is inferred that the shock absorbing capacity was not reduced.

As described above, it was confirmed that the influence on the shock absorbing capacity due to the orientation of the impact surface of the impacted object that has impacted the bumper fascia was reduced without making the structure of the bumper fascia complicated.

Example 2

In this example, for absorber samples in which the lengths L0 of in the front-back direction were 44 mm and 60 mm, the shock absorbing capacity was measured when the lengths L12 and L14 of each of the recessed portions in the vertical direction was changed to 5 mm, 7.5 mm, 10 mm, 12.5 mm. and 15 mm. The rigid legs, the bead-shaped pre-expanded particles, and the bumper cover material equivalent that were used were the same as those in example 1, and each of the absorber examples were manufactured in the same manner as those in example 1. For the absorber samples in which the L0 was 44 mm, the length L2 of each of the recessed portions in the front-back direction was 25 mm, the length in the transverse direction of the vehicle was 200 mm, the thicknesses L11 and L15 of each of the flexible legs in the vertical direction were all 22 mm, and the heights in the vertical direction were respectively 90 mm, 100 mm, 110 mm, 120 mm, and 130 mm. For the absorber samples in which the L0 was 60 mm, the length L2 of each of the recessed portions in the front-back direction was 33 mm and the length in the transverse direction of the vehicle was 200 mm, and the thicknesses L11 and L15 of each of the flexible legs in the vertical direction were all 22 mm and the heights in the vertical direction were respectively 90 mm, 100 mm, 110 mm, 120 mm, and 130 mm.

Experimental Method

Similar to example 1, the end portions on the reinforcing side of the flexible legs and the rigid legs were abutted against the receiving fixture of the compression load measuring apparatus, each of the absorber samples was installed in sequence, and the bumper cover material equivalent was brought into contact with and disposed on the front surface of the absorber sample. The direction of extension of the flexible legs and the rigid legs was horizontal. In addition, depending on the movement position of the impactor, which was moved at 20 km/h, the compression load F was detected and the shock absorbing capacity was measured.

Experimental Results

FIG. 22 shows the results of graphing the compression load with respect to the displacement x of each of the test samples, where the upper portion shows the results for the samples having L0=44 mm and the lower portion shows the results for the samples having L0=60 mm. In both cases, during the initial stage in which the displacement x was approximately 0 to 10 mm, the compression load rose between approximately 4 to 5 kN, and subsequently, the compression load continued in a constant state.

As described above, in the case in which the lengths L12 and L14 of each of the recessed portions in the vertical direction were 5 to 15 mm, it was understood that an advantageous shock absorbing capacity could be obtained. Note that when the length of the recessed portions in the vertical direction was 5 mm, which is comparatively short, there was a tendency for the compression load to become large, and when the length of the recessed portions in the vertical direction was 15 mm, which is comparatively long, the compression load had a tendency to become small. Thus, when the lengths L12 and L14 were set from 7.5 to 12.5 mm, it was understood that a more advantageous shock absorbing capacity could be obtained.

Example 3

In this example, for absorber samples in which the lengths L0 in the front-back direction were 44 mm and 60 mm, the shock absorbing capacity was measured when the ratios L2/L0 of the length L2 of each of the recessed portions in the front-back direction were changed to approximately 35%, approximately 55%, and approximately 80%. The rigid legs, the bead-shaped pre-expanded particles, and the bumper cover material equivalent that were used were the same as those in example 1, and each of the absorber samples were manufactured similarly to those in example 1. For the absorber samples in which L0 was 44 mm, the lengths L2 of the recessed portions in the front-back direction were respectively 15 mm (34%), 25 mm (57%), and 35 mm (80%), the lengths L12 and L14 of each of the recessed portions in the vertical direction were 7.5 mm and the length in the transverse direction of the vehicle was 200 mm, the thicknesses L11 and L15 of each of the flexible legs in the vertical direction were all 22 mm and the heights in the vertical direction were all 100 mm. For the absorber samples in which the L0 was 60 mm, the lengths L2 of the recessed portions in the front-back direction were set at 21 mm (35%), 33 mm (55%), and 48 mm (80%), the lengths L12 and L14 of each of the recessed portions in the vertical direction were 7.5 mm, the length in the transverse direction of the vehicle was 200 mm, and the thicknesses L11 and L15 of each of the flexible legs in the vertical direction were all 22 mm, and the height in the vertical direction was 100 mm.

Experimental Method

The shock absorbing capacity was measured by the experimental method that was the same as that of example 2.

Experimental Results

FIG. 23 shows the results of graphing the compression load with respect to the displacement x of each of the test samples, where the upper portion shows the results for the samples in which L0=44 and the lower portion shows the results for the sample in which L0=60 mm. In both cases, during the initial stage in which the displacement x was approximately 0 to 10 mm, the compression load rose between 3.5 to 6 kN, and subsequently, the compression load continued in a substantially constant state.

As described above, in the case in which the ratio L2/L0 of the length L2 of each of the recessed portions in the front-back direction was set from 0.35 to 0.80, it was understood that an advantageous shock absorbing capacity could be obtained. Moreover, when the ratio of the length of the recessed portions in the front-back direction was 0.35, which is comparatively short, there was a tendency for the compression load to become large, and when the ratio of the length of the recessed portions was 0.80, which is comparatively long, there was a tendency for the compression load to become small. Thus, it was understood that when the ratio L2/L0 of the length was approximately 0.50 to 0.60, a more advantageous shock absorbing capacity could be obtained.

(12) Modified Examples

In each of the embodiments described above, the flexible legs, the rigid legs, and the crosslinking portions may be formed into a curved shape such as a wave while the longitudinal direction thereof is in a horizontal direction, and may be disposed such that the longitudinal direction is disposed in a direction other than the horizontal direction.

It is possible to form only one recessed portion described above in the absorber. It is possible to provide only one rigid leg described above in the absorber. In this case, only one opening may be formed between the flexible leg and the rigid leg on the bumper fascia side. It is possible to form one flexible portion described above in the absorber. For example, it is possible to form the absorber of the present invention by disposing a pair of plate-shaped rigid legs above and below a single flexible leg so as not to be in contact with the same.

It is possible to provide only one through hole in the crosslinking portions described above in the absorber. In the case in which a plurality of rigid legs were provided in the absorber, a through hole that joins the plurality of rigid legs may be formed in the crosslinking portion.

Note that the present invention is not limited by the examples or the modified examples described above, and structures in which each of the structures disclosed in the examples and the modified examples replace each other or the combinations thereof are modified and structures in which well-known technology and each of the structures disclosed in the examples and the modified examples replace each other or the combinations thereof are modified and the like are included.

According to a first and ninth aspects of the present invention, the structure of the bumper fascia is not made complicated, and it is possible to reduce the influence on the shock absorbing capacity due to of the orientation of the impact surface of the impacted object that has impacted the bumper fascia.

According to a second aspect of the present invention, because the crosslinking portion and the first and second energy absorbing portions are molded simultaneously, it is possible to reduce the number of processing steps for the absorber, and it is possible to provide a bumper absorber that can be manufactured with a high efficiency.

According to a third aspect of the present invention, because deformation of the second energy absorbing portion can be prevented during the molding of the absorber, it is possible to improve the processing precision of the absorber, and it is possible to provide a bumper absorber that is advantageous in terms of processing precision.

According to a fourth aspect of the present invention, the bending direction of the second energy absorbing portion is restricted to the direction of one of the first energy absorbing portions, between which the second energy absorbing portion is placed, and it is possible to further stabilize the shock absorbing capacity.

According to a fifth aspect of the present invention, although the upper side of the bumper absorber is positioned in proximity to the knee of a pedestrian, it is possible to make the slope of the rising load at the position in proximity to the knee small by displacing downward the second energy absorbing portion. In the second absorbing portion, the slope of the rising load on the deformation-load curve second energy absorbing portion during impact is comparatively large. Thus, it is possible to reduce the shock that is applied to the knee of the pedestrian.

According to a sixth aspect of the present invention, even if the impact surface of the impacted object is not perpendicular to the direction in which the bumper reinforcement and the bumper fascia are joined, at the second energy absorbing portion, an action that prevents the collapse of the second energy absorbing portion can readily be obtained because portions that branch off along the second energy absorbing portion are crushed, and it is possible thereby to obtain a more stable shock absorbing capacity.

According to a seventh aspect of the present invention, because the slope of the rising load on the deformation-load curve becomes larger due to the reaction force of the second energy absorbing portion during the initial stage of the impact, it is possible to provide a bumper absorber that makes the slope of the rising load large.

According to an eighth aspect of the present invention, it is possible to provide a bumper absorber that can receive an imparted load during impact over a wide surface of the second energy absorbing portion.

According to a tenth aspect of the present invention, it is possible to reduce the number of processing steps for the absorber, it is possible to improve the processing precision of the absorber, and it is possible to manufacture a bumper absorber that has an advantageous processing precision at a high efficiency.

Another aspect of the present invention provides a bumper absorber that is provided on an automobile between a bumper reinforcement and a bumper fascia that is more toward a vehicle exterior side than the bumper reinforcement, comprising:

a first energy absorbing portion that is formed by foaming a resin molded material and extends from the bumper reinforcement toward the bumper fascia;

a second energy absorbing portion that is formed by a resin molded material, and extends from the bumper reinforcement toward the bumper fascia at a position where a space that permits buckling is formed between the first energy absorbing portion and the second energy absorbing portion on the bumper reinforcement side; and a crosslinking portion that is disposed facing a vehicle interior side of the bumper fascia, and fastens the first energy absorbing portion and the second energy absorbing portion together while sealing an opening between the first energy absorbing portion and the second energy absorbing portion on the bumper fascia side.

Another aspect of the present invention provides a manufacturing method for a bumper absorber that is provided on an automobile between a bumper reinforcement and a bumper fascia that is more toward the vehicle exterior side than the bumper reinforcement, that uses:

a molding die that shapes the bumper absorber such that the bumper absorber is provided with a first energy absorbing portion that extends from the bumper reinforcement toward the bumper fascia, a second energy absorbing portion that extends from the bumper reinforcement toward the bumper fascia at a position where a space that permits buckling is formed between the first energy absorbing portion and the second energy absorbing portion on the bumper reinforcement side, a crosslinking portion that fastens the first energy absorbing portion and the second energy absorbing portion together while sealing an opening between the first energy absorbing portion and the second energy absorbing portion on the bumper fascia side; and a supporting portion that passes through the crosslinking portion from the bumper fascia side and supports a resin molded body at the position of the second energy absorbing portion in the mold die, the manufacturing method for a bumper absorber comprising the steps of:

inserting the resin molded body into a molding die at the position of the second energy absorbing portion, supporting the same by the supporting portion, and inserting a resin molded material that includes a foaming agent into the molding die; and forming the crosslinking portion and the first energy absorbing portion simultaneously by foaming the resin molded material while forming a through hole in the crosslinking portion at the position of the supporting portion so as to integrate the crosslinking portion and the first energy absorbing portion with the resin molded body.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

What is claimed is:

1. A bumper absorber that is provided on an automobile between a bumper reinforcement and a bumper fascia that is more toward a vehicle exterior side than the bumper reinforcement, comprising:

a first energy absorbing portion formed by foaming a resin molded material;

the first energy absorbing portion extending from the bumper reinforcement toward the bumper fascia;

a second energy absorbing portion formed by a resin molded material;

the second energy absorbing portion extending from the bumper reinforcement toward the bumper fascia at a position where a space that permits buckling of the second energy absorbing portion is formed between the first energy absorbing portion and the second energy absorbing portion on a bumper reinforcement side;

a crosslinking portion disposed facing a vehicle interior side of the bumper fascia; and the crosslinking portion fastening the first energy absorbing portion and the second energy absorbing portion together while sealing at least half of an area of an opening between the first energy absorbing portion and the second energy absorbing portion on a bumper fascia side;

wherein a plurality of the first energy absorbing portions is disposed from the crosslinking portion toward the bumper reinforcement such that a groove-shaped recessed portion is formed on the bumper reinforcement side;

the second energy absorbing portion is formed into a plate shape;

the second energy absorbing portion extends from the crosslinking portion toward the bumper reinforcement into the recessed portion at a position where the space is formed that permits buckling of the second energy absorbing portion;

a density of the second energy absorbing portion is 0.9 to 1.2 g/cm$^3$; and the crosslinking portion fastening the first energy absorbing portion and the second energy absorbing portion together is formed by foaming a resin molded material.

2. The bumper absorber according to claim 1, wherein:

the crosslinking portion is formed by foaming and molding a resin molded material simultaneously with the first energy absorbing portion while sandwiching an edge portion of the second energy absorbing portion on the bumper fascia side; and the crosslinking portion and the first and second energy absorbing portions are integrally formed.

3. The bumper absorber according to claim 2, wherein the crosslinking portion has a through hole that joins the bumper reinforcement side and the bumper fascia side in order to insert a supporting portion that supports the edge portion of the second energy absorbing portion on the bumper fascia side during molding, and fastens the first energy absorbing portion and the second energy absorbing portion together while sealing at least half of an area of the opening between the first energy absorbing portion and the second energy absorbing portion on the bumper fascia side.

4. The bumper absorber according to claim 3, wherein:

the second energy absorbing portion is placed between a pair of the first energy absorbing portions;

one of the pair of the first energy absorbing portions is disposed so as to be separated from the second energy absorbing portion; and the other of the pair of the first energy absorbing portions has a portion that projects inside the recessed portion in a direction that differs from a direction in which the bumper reinforcement and the bumper fascia are joined and abuts the second energy absorbing portions.

5. The bumper absorber according to claim 1, wherein the second energy absorbing portion is provided downward in the bumper absorber.

6. The bumper absorber according to claim 1, wherein the second energy absorbing portion branches midway while extending from the bumper fascia side toward the bumper reinforcement side, and contacts the bumper reinforcement at a distal end portion in each of directions of extension after extending in a plurality of directions that differ from the direction of extension.

7. The bumper absorber according to claim 1, wherein the second energy absorbing portion extends from the bumper reinforcement side toward the bumper fascia up to a position that is in contact with the bumper fascia.

8. The bumper absorber according to claim 1, wherein the crosslinking portion covers the edge portion of the second energy absorbing portion on the bumper fascia side to separate the second energy absorbing portion from the bumper fascia.

* * * * *